United States Patent
Plakhov et al.

(10) Patent No.: US 9,449,079 B2
(45) Date of Patent: *Sep. 20, 2016

(54) METHOD OF AND SYSTEM FOR DISPLAYING A PLURALITY OF USER-SELECTABLE REFINEMENTS TO A SEARCH QUERY

(71) Applicant: YANDEX EUROPE AG, Lucerne (CH)

(72) Inventors: Andrey Grigorievich Plakhov, Sergiev Posad (RU); Alexander Ivanovich Mazaykin, Elektrougli (RU); Marina Sergeevna Khoruzhenko, Sergiev Posad (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/243,199

(22) Filed: Apr. 2, 2014

(65) Prior Publication Data
US 2015/0006504 A1    Jan. 1, 2015

Related U.S. Application Data

(60) Provisional application No. 61/841,269, filed on Jun. 28, 2013.

(51) Int. Cl.
*G06F 15/18* (2006.01)
*G06F 17/30* (2006.01)

(52) U.S. Cl.
CPC ..... *G06F 17/30651* (2013.01); *G06F 17/3053* (2013.01); *G06F 17/30554* (2013.01); *G06F 17/30867* (2013.01)

(58) Field of Classification Search
CPC .................. G06F 17/30864; G06F 17/30646; G06F 17/30672; G06F 17/3064; G06F 17/30696; G06F 17/30991; G06F 17/30637; G06F 17/30651; G06F 17/30705; G06F 17/3071; G06F 17/30994; G06F 9/4443; G06F 17/30867; G06F 17/30011; G06F 3/0481; G06F 17/30693; G06F 17/30702; G06F 17/3053

See application file for complete search history.

(56) References Cited

U.S. PATENT DOCUMENTS

| | | | |
|---|---|---|---|
| 7,953,730 B1* | 5/2011 | Bleckner et al. | 707/722 |
| 7,958,143 B1* | 6/2011 | Amacker | 707/771 |
| 7,962,504 B1* | 6/2011 | Mehanna | 707/765 |
| 8,341,146 B1 | 12/2012 | Bleckner et al. | |
| 8,577,911 B1* | 11/2013 | Stepinski | G06F 17/30 707/765 |
| 2004/0186827 A1* | 9/2004 | Anick et al. | 707/3 |

(Continued)

Primary Examiner — Tarek Chbouki
(74) Attorney, Agent, or Firm — BCF LLP

(57) ABSTRACT

Method of displaying by a client application in communication with a search engine a plurality of user-selectable refinements to a search query including a search term, comprising: sending the search query; receiving search results and suggested search query refinements determined based at least in part on an analysis of groups of related search queries, each suggested search query refinement corresponding to a refined search query including the search term and an additional search term; displaying search results and, apart from a search bar, refinements, refinements being selectable by a user via a graphical object; receiving a selection of one of the refinements, the selection corresponding to a refined search query including the search term and an additional search term; receiving refined search results; and displaying refined search results and a visual representation of a refinement relationship between the search query and the refined search query. Related systems are also disclosed.

26 Claims, 16 Drawing Sheets

(56) References Cited

U.S. PATENT DOCUMENTS

| | | | |
|---|---|---|---|
| 2006/0161520 A1* | 7/2006 | Brewer | G06F 17/3064 |
| 2008/0301128 A1* | 12/2008 | Gandert et al. | 707/5 |
| 2009/0217179 A1* | 8/2009 | Mons | G06F 17/30716 715/760 |
| 2010/0146012 A1* | 6/2010 | Beaudreau et al. | 707/803 |
| 2010/0179964 A1 | 7/2010 | Ramaswamy | |
| 2010/0312724 A1* | 12/2010 | Pinckney et al. | 706/11 |
| 2011/0302117 A1* | 12/2011 | Pinckney et al. | 706/12 |
| 2012/0179705 A1 | 7/2012 | Kumaran et al. | |
| 2013/0097173 A1* | 4/2013 | Stovicek | G06F 3/04883 707/741 |
| 2014/0149399 A1* | 5/2014 | Kurzion | G06F 17/30867 707/723 |

\* cited by examiner

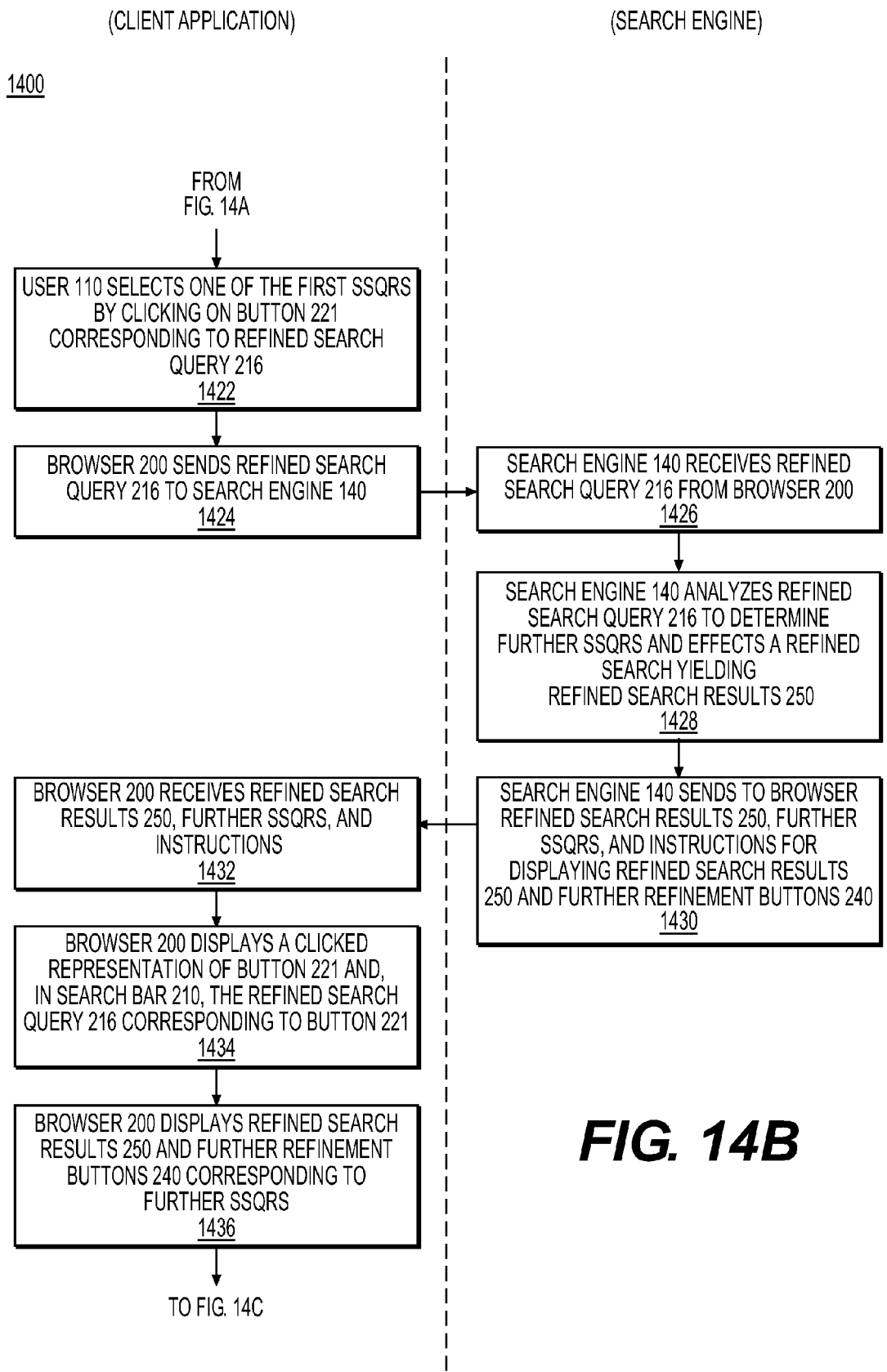

METHOD OF AND SYSTEM FOR DISPLAYING A PLURALITY OF USER-SELECTABLE REFINEMENTS TO A SEARCH QUERY

CROSS-REFERENCE

The present application claims priority to U.S. Provisional Patent Application No. 61/841,269, filed Jun. 28, 2013, entitled "Method of and System for Displaying a Plurality of User-Selectable Refinements to a Search Query", the contents of which are incorporated by reference herein in their entirety in those jurisdictions allowing for incorporations by reference.

FIELD

The present technology relates to methods of and systems for displaying a plurality of user-selectable refinements to a search query.

BACKGROUND

The Internet has become a popular resource for seeking various types of information including news, entertainment, maps, retail product information, and academic research. However, the sheer breadth of information available on the Internet can make it challenging to find a specific resource among the estimated tens of billions of web pages in existence today. In order to find particular resources of interest, users generally submit search queries to a search engine via its user interface. There are currently several search engines continually updating their respective indexes of resources available on the Internet. A user seeking particular Internet resources may submit to a search engine a search query including search terms that are related to the Internet resources sought. The search engine analyzes the search query and responds with a listing of links to Internet resources bearing a relation to the search query. The user generally enters the search terms via a text entry form, known as a search bar, which is either displayed on the search engine's web interface or embedded in the user's web browser, and the search results are generally displayed to the user on a search engine results page (SERP).

SUMMARY

When a user submits a vague search query to a search engine, the range of corresponding search results tends to be quite broad. In some instances, the search engine may possess information enabling it to suggest refinements to the search query first submitted by the user, each leading to a refined search query potentially yielding search results of greater interest to the user than those which resulted from the first search query. For example, the search engine may possess information regarding related search queries having been submitted either by the user, another user, or an aggregation of users, along with information regarding user satisfaction with the results of the corresponding search queries.

It is thus an object of the present technology to ameliorate at least some of the inconveniences present in the prior art and to provide improved searching.

The present technology provides a method of displaying, along with first search results in respect of a first search query, suggested refinements to the first search query, each corresponding to a refined search query including the terms of the first search query and at least one additional term. Each suggested search query refinement, when selected by the user, causes refined search results to be displayed. For example, a user who submits the search query "Jennifer Lopez" may be primarily interested in Jennifer Lopez's music, photos of her, movies in which she starred, fashion commentary, news about her personal life, or some other type of information related to Jennifer Lopez. In such cases, it would be convenient for the user to be able to quickly select among these clusters of search results. Moreover, in circumstances in which the user is not aware of the various clusters of search results relating to his or her initial search query, the present technology enables a search engine to highlight the existence of such clusters to the user and to offer the user an opportunity to target his or her search to clusters previously unknown to him or her.

The present technology allows the search engine to suggest to the user for each cluster of search results a corresponding search query refinement, each suggested search query refinement (SSQR) consisting of one or more search terms which can be added to the search terms included in the user's first search query to form a refined search query targeting one of the clusters of search results. By selecting one of the SSQRs, the user may refine his or her original search and obtain search results which correspond more specifically to his or her interests. The present technology thus provides a means of increasing the relevance of search results displayed to the user.

In some implementations described herein, selecting an SSQR triggers a refined search to be effected using a search query containing all the search terms of the first search query plus one or more search term(s) corresponding to the SSQR. In other implementations, the results of refined searches related to the SSQRs are provided along with the first search results without having been specifically requested, and selecting an SSQR simply causes the related refined search results that have already been obtained to be displayed.

In contrast with conventional approaches wherein a search engine suggests refinements to search queries by proposing additional search terms before any search is performed, the present technology suggests search query refinements after a first search has been performed and displays them along with the results of that first search, allowing a user to quickly perform a broad first search and to decide only later whether or not to refine the search, with the benefit of having already obtained first search results upon which to evaluate whether further refinement is necessary. Moreover, because the search engine has information to which a user may not have access, such as information about different categories of Internet resources and statistical information regarding past searches, in many cases it is better placed than the user to determine the best manner in which to refine a search query. Thus, the search engine may propose search query refinements corresponding to more effective search queries than those a user would have devised on his or her own, especially in cases where the user is unaware or only vaguely aware of the various categories of Internet resources related to the first search query, only some of which may be of particular interest to him or her. Accordingly, the present technology allows a user to employ an interactive search strategy whereby a relatively broad first query is entered and then progressively refined with the help of informed feedback from the search engine.

Further, while some conventional approaches suggest search query refinements by displaying additional potential search terms in the search bar as first search terms are being entered, the present technology allows a user to select suggested search query refinements via one or more graphical objects. Moreover, in some implementations a visual representation of the refinement relationship between the first search query and subsequent refined search queries derived from the first search query is displayed, allowing the user to intuitively navigate through a universe of related search queries and search results.

In various implementations described herein, the SSQRs appear as user-selectable buttons on the search engine results page (SERP). By selecting any of these buttons, the user indicates his or her desire to have the SSQR applied to the first search query to refine the first search. In a further implementation, when a second button is clicked after a first button had been clicked, an indication that the first button was previously clicked is displayed. The present technology thus enables a user to quickly observe his or her search history and to navigate intuitively within a universe of search results and refined search results related to the first search query.

In one aspect, some implementations of the present technology provide a method of displaying by a client application running on at least one digital electronic device in communication with a search engine a plurality of user-selectable refinements to a first search query including at least one first search term, the method comprising:
  sending by the client application to the search engine the first search query;
  receiving by the client application from the search engine first search results in respect of the first search query and first suggested search query refinements having been determined by the search engine based at least in part on an analysis of groups of related search queries being related to the first search query, each of the first suggested search query refinements corresponding to a refined search query including the at least one first search term and at least one additional search term;
  displaying by the client application at least one first search result and, apart from a search bar, the first suggested search query refinements, the first suggested search query refinements being selectable by a user via at least one first graphical object;
  receiving by the client application from a user via the at least one first graphical object a first selection of one of the first suggested search query refinements, the first selection corresponding to a first refined search query including the at least one first search term and at least one first additional search term;
  receiving by the client application from the search engine first refined search results in respect of the first refined search query; and
  displaying by the client application at least one first refined search result and a visual representation of a refinement relationship between the first search query and the first refined search query.

In some implementations, after receiving the first selection from the user, the client application sends to the search engine a request to obtain the first refined search results. Such a request may consist of any information allowing the search engine to recognize that the client application is requesting search results in respect of the first refined search query, and may or may not include the first refined search query. In other implementations, the client receives the first refined search results (and possibly other refined search results) from the search engine without having requested them.

The present technology allows a user to select various suggested search query refinements via one or more graphical objects. As those skilled in the art will understand, there are many types of graphical objects that could be displayed to allow a user to make a selection of a suggested search query refinement. In some implementations, the user selects a suggested search query refinement by selecting one of a plurality of buttons. Thus, in some implementations:
  displaying by the client application at least one first search result and, apart from a search bar, the first suggested search query refinements, the first suggested search query refinements being selectable by a user via at least one first graphical object includes displaying by the client application a first plurality of buttons selectable by a user, each button in the first plurality of buttons corresponding to one of the first suggested search query refinements and including text representative of that suggested search query refinement; and
  receiving by the client application from a user via the at least one first graphical object a first selection of one of the first suggested search query refinements, the first selection corresponding to a first refined search query including the at least one first search term and at least one first additional search term is receiving by the client application from a user a selection of a button from the first plurality of buttons.

In some further implementations, displaying by the client application at least one first refined search result and a visual representation of a refinement relationship between the first search query and the first refined search query includes displaying a visual indication that the button has been selected.

There are many other well-known types of graphical objects via which the user could make a selection of a suggested search query refinement in various implementations. The following is a non-exhaustive list:
  a list box, each item in the list corresponding to a suggested search query refinement;
  a drop-down list, each item in the list corresponding to a suggested search query refinement;
  a plurality of radio buttons, each radio button corresponding to a suggested search query refinement;
  an expandable tree, each node in the tree corresponding to a suggested search query refinement; and
  a three-dimensional object that can be rotated by the user to reveal its various faces, each face corresponding to a suggested search query refinement or a plurality of suggested search query refinements.

The user may select a suggested search query refinement by appropriately interacting with the graphical object(s) using an input device, for example by clicking on a button with a mouse, by scrolling through a list box using a keyboard, or by sliding a finger across a touchscreen to spin a three-dimensional object and tapping a finger on one of the object's faces.

In some implementations, the client application further receives from a user via the at least one first graphical object a second selection of one of the first suggested search query refinements, the second selection corresponding to a second refined search query including the at least one first search term and at least one second additional search term; receives from the search engine second refined search results in respect of the second refined search query; and displays at least one second refined search result and a visual representation of a refinement relationship between the first search query and the second refined search query. In some further implementations, the client application sends to the search engine a request to obtain the first refined search results after receiving the first selection from the user and a request to obtain the second refined search results after receiving the second selection from the user. Such requests may include the refined search query in question or other information allowing the search engine to recognize that the client application is requesting search results in respect of the refined search query. In other implementations, the client application receives the first refined search results and the second refined search results from the search engine without having requested them.

In some implementations, the client application displays, concurrently with the visual representation of a refinement relationship between the first search query and the second refined search query, a visual indication that the at least one first refined search result was displayed before the at least one second refined search result was displayed. As a non-limiting example, the client application may display a graphical object or a portion of a graphical object associated with the first refined search query with a different color, size, or font than those of graphical objects or portions of graphical objects associated with refined search queries in respect of which refined search results were not displayed before the second refined search results were displayed.

In some implementations, the user makes the second selection by selecting a button corresponding to the second refined search query. Thus, in some implementations:
  displaying by the client application at least one first search result and, apart from a search bar, the first suggested search query refinements, the first suggested search query refinements being selectable by a user via at least one first graphical object includes displaying by the client application a first plurality of buttons selectable by a user, each button in the first plurality of buttons corresponding to one of the first suggested search query refinements and including text representative of that suggested search query refinement;
  receiving by the client application from a user via the at least one first graphical object a first selection of one of the first suggested search query refinements, the first selection corresponding to a first refined search query including the at least one first search term and at least one first additional search term is receiving by the client application from a user a selection of a first button from the first plurality of buttons; and
  receiving by the client application from a user via the at least one first graphical object a second selection of one of the first suggested search query refinements, the second selection corresponding to a second refined search query including the at least one first search term and at least one second additional search term is receiving by the client application from a user a selection of a second button from the first plurality of buttons.

In some further implementations, the client application displays a visual indication that the first button has been selected and a visual indication the second button has been selected. Thus, in some further implementations:
  displaying by the client application at least one first refined search result and a visual representation of a refinement relationship between the first search query and the first refined search query includes displaying by the client application a visual indication that the first button has been selected; and
  displaying by the client application at least one second refined search result and a visual representation of a refinement relationship between the first search query and the second refined search query includes displaying by the client application a visual indication that the second button has been selected.

In some further implementations, the client application displays, concurrently with the visual indication the second button has been selected, a visual indication that the first button was selected before the second button was selected.

In some further implementations, one or more of another well-known type of graphical objects may be displayed by the client application, and the user may make one or more of a first selection and a second selection of a suggested search query refinement by interacting appropriately with the one or more graphical objects. Examples of well-known types of graphical objects include list boxes, drop-down lists, radio buttons, expandable trees, and three-dimensional objects with multiple faces.

In some implementations, the client application displays second suggested search query refinements selectable by the user via one or more graphical objects in order to further refine the search query. The resulting further-refined search query includes the search terms of the first refined search query as well as additional terms that further refine the search. Thus, in some implementations, the client application receives from the search engine second suggested search query refinements, each of the second suggested search query refinements corresponding to a further-refined search query including the at least one first search term, the at least one first additional search term, and at least one further additional search term; displays, apart from the search bar and apart from the first suggested search query refinements, the second suggested search query refinements, the second suggested search query refinements being selectable by a user via at least one second graphical object; receives from a user via the at least one second graphical object a second selection of one of the second suggested search query refinements, the second selection corresponding to a further-refined search query including the at least one first search term, the at least one first additional search term, and at least one further additional search term; receives from the search engine further-refined search results in respect of the further-refined search query; and displays at least one further-refined search result and a visual representation of a refinement relationship between the first search query, the first refined search query, and the further-refined search query. In some further implementations, the client application sends to the search engine a request to obtain the first refined search results after receiving the first selection from the user and a request to obtain the further-refined search results after receiving the second selection from the user. Such requests may include the first refined search query or the further-refined search query, as the case may be, or other information allowing the search engine to recognize that the client application is requesting search results in respect of the first refined search query or the further-refined search query. In other implementations, the client application receives the first refined search results and the further-refined search results from the search engine without having requested them.

In some implementations, the client application displays a second set of buttons and the user makes the second selection by selecting a button corresponding to the further-refined search query. Thus, in some implementations:
  displaying by the client application at least one first search result and, apart from a search bar, the first suggested search query refinements, the first suggested search query refinements being selectable by a user via at least one first graphical object includes displaying by the client application a first plurality of buttons selectable by a user, each button in the first plurality of buttons corresponding to one of the first suggested search query refinements and including text representative of that suggested search query refinement;

receiving by the client application from a user via the at least one first graphical object a first selection of one of the first suggested search query refinements, the first selection corresponding to a first refined search query including the at least one first search term and at least one first additional search term is receiving by the client application from a user a selection of a first button from the first plurality of buttons;

displaying by the client application, apart from the search bar and apart from the first suggested search query refinements, the second suggested search query refinements, the second suggested search query refinements being selectable by a user via at least one second graphical object includes displaying by the client application, apart from the first plurality of buttons, a second plurality of buttons selectable by a user, each button in the second plurality of buttons corresponding to one of the second suggested search query refinements and including text representative of that suggested search query refinement; and receiving by the client application from a user via the at least one second graphical object a second selection of one of the second suggested search query refinements, the second selection corresponding to a further-refined search query including the at least one first search term, the at least one first additional search term, and at least one further additional search term is receiving by the client application from a user a selection of a second button from the second plurality of buttons.

In some further implementations, the client application displays a visual indication that the first button has been selected and a visual indication the second button has been selected. Thus, in some implementations:

displaying by the client application at least one first refined search result and a visual representation of a refinement relationship between the first search query and the first refined search query includes displaying by the client application a visual indication that the first button has been selected; and displaying by the client application at least one further-refined search result and a visual representation of a refinement relationship between the first search query, the first refined search query, and the further-refined search query includes displaying by the client application a visual indication that the second button has been selected.

In some further implementations, one or more of another well-known type of graphical objects may be displayed by the client application, and the user may make one or more of a first selection and a second selection of a suggested search query refinement by interacting appropriately with the one or more graphical objects. Examples of well-known types of graphical objects include list boxes, drop-down lists, radio buttons, expandable trees, and three-dimensional objects with multiple faces.

In some implementations, the client application displays, in the search bar, the search terms of a tentative refined search query corresponding to a tentative selection of a suggested search query refinement received from a user. In this manner, the client application provides feedback to the user allowing him or her to see the search query in respect of which search results would be displayed if he or she were to select a particular suggested search query refinement.

Thus, in some implementations, the client application receives from a user via the at least one first graphical object a tentative selection of one of the first suggested search query refinements, the tentative selection corresponding to a tentative refined search query, the tentative refined search query including the at least one first search term and at least one tentative additional search term; and displays in the search bar the tentative refined search query.

In some implementations, a user makes the tentative selection by placing a pointer over a button corresponding to that suggested search query refinement. As non-limiting examples, the user may use a mouse to move a mouse cursor over the button, or touch and hold (without releasing) a button displayed on a touch-screen using a finger, a stylus, or another device. Thus, in some implementations:

displaying by the client application at least one first search result and, apart from a search bar, the first suggested search query refinements, the first suggested search query refinements being selectable by a user via at least one first graphical object includes displaying by the client application a first plurality of buttons selectable by a user, each button in the first plurality of buttons corresponding to one of the first suggested search query refinements and including text representative of that suggested search query refinement; and receiving by the client application from a user via the at least one first graphical object a tentative selection of one of the first suggested search query refinements, the tentative selection corresponding to a tentative refined search query, the tentative refined search query including the at least one first search term and at least one tentative additional search term is receiving by the client application an indication that a pointer controlled by a user is located over a button from the first plurality of buttons.

In some implementations, one or more of another well-known type of graphical objects may be displayed by the client application, and the user may make a tentative selection of a suggested search query refinement by interacting appropriately with the one or more graphical objects. Examples of well-known types of graphical objects include list boxes, drop-down lists, radio buttons, expandable trees, and three-dimensional objects with multiple faces.

In some implementations, the first search query is entered by a user via the search bar, and the client application displays the first refined search query in the search bar when displaying one or more of the first refined search results. In some further implementations, when a user tentatively cancels his or her selection of the first refined suggested search query refinement, the client application displays the first search query in the search bar in order to show the user that a cancellation of the first selection would lead the client application to display the first search results instead of the first refined search results. Thus, in some further implementations, the client application receives from a user via the at least one first graphical object a tentative cancellation of the first selection and displays in the search bar the first search query in lieu of the first refined search query.

In some implementations a user carries out the first selection and the tentative cancellation of the first selection by selecting a button and placing a pointer over the button, respectively. Thus, in some implementations:

displaying by the client application at least one first search result and, apart from a search bar, the first suggested search query refinements, the first suggested search query refinements being selectable by a user via at least one first graphical object includes displaying by the client application a first plurality of buttons selectable by a user, each button in the first plurality of buttons corresponding to one of the first suggested search query refinements and including text representative of that suggested search query refinement;

receiving by the client application from a user via the at least one first graphical object a first selection of one of the first suggested search query refinements, the first selection corresponding to a first refined search query including the at least one first search term and at least one first additional search term is receiving by the client application from a user a selection of a button from the first plurality of buttons; and receiving by the client application from a user via the at least one first graphical object a tentative selection of one of the first suggested search query refinements, the tentative selection corresponding to a tentative refined search query, the tentative refined search query including the at least one first search term and at least one tentative additional search term is receiving by the client application an indication that a pointer controlled by a user is located over the button.

In some implementations, one or more of another well-known type of graphical objects may be displayed by the client application, and the user may make one or more of a first selection and a tentative selection of a suggested search query refinement by interacting appropriately with those one or more graphical objects. Examples of well-known types of graphical objects include list boxes, drop-down lists, radio buttons, expandable trees, and three-dimensional objects with multiple faces.

In some implementations, the client application receives from a user via the at least one first graphical object a cancellation of the first selection and displays the at least one first search result in lieu of the at least one first refined search result.

It should be noted that some implementations of the present technology do not require that the client application display all of the information received from the search engine, nor do some implementations require that the client application follow any or all instructions received from the search engine. For example, in some implementations of the present technology, the client application does not display any graphical objects corresponding to further suggested search query refinements, despite having received from the search engine such further suggested search query refinements and instructions to display them.

In some implementations, the analysis of the groups of related search queries includes an analysis of past user behaviors of users having submitted the related search queries. In some implementations, the analysis of the groups of related search queries includes: filtering the related search queries to only those identified as having provided search results which provided a user with information sought by the user; grouping the filtered related search queries into the groups based on subsequent user behaviors of the users; and determining a suggested search query refinement for each of at least some of the groups. In some further implementations, grouping the filtered related search queries into the groups based on subsequent user behaviors of the users includes identifying common Internet resources having been visited by the users after they were provided with search results in response to the filtered related search queries.

In another aspect, some implementations of the present technology provide a method of providing to a client application running on at least one digital electronic device in communication with a search engine a plurality of user-selectable refinements to a first search query including at least one first search term, the method comprising:

receiving by the search engine from the client application the first search query;

effecting by the search engine a first search in respect of the first search query yielding first search results;

determining first suggested search query refinements based at least in part on an analysis of groups of related search queries being related to the first search query, each of the first suggested search query refinements corresponding to a refined search query including the at least one first search term and at least one additional search term;

sending by the search engine to the client application the first search results, the first suggested search query refinements, and instructions for displaying (1) at least one first search result and (2) apart from a search bar, the first suggested search query refinements, the first suggested search query refinements being selectable by a user via at least one first graphical object;

effecting by the search engine a first refined search in respect of a first refined search query including the at least one first search term and at least one first additional search term, the first refined search yielding first refined search results; and sending by the search engine to the client application the first refined search results and instructions for displaying at least one first refined search result and a visual representation of a refinement relationship between the first search query and the first refined search query.

In some implementations, the search engine receives from the client application a request to obtain the first refined search results after sending to the client application instructions for displaying the first suggested search query refinements. Such a request may consist of any information allowing the search engine to recognize that the client application is requesting search results in respect of the first refined search query, and may or may not include the first refined search query. In other implementations, the search engine sends the first refined search results to the client application without having received a request to provide them.

The present technology allows a user to select various suggested search query refinements via one or more graphical objects. As those skilled in the art will understand, there are many types of graphical objects that could be displayed to allow a user to make a selection of a suggested search query refinement. In some implementations, the user may select a suggested search query refinement by selecting one of a plurality of buttons. Thus, in some implementations, sending by the search engine to the client application the first search results, first suggested search query refinements, each of the first suggested search query refinements corresponding to a refined search query including the at least one first search term and at least one additional search term, and instructions for displaying at least one first search result and, apart from a search bar, the first suggested search query refinements, the first suggested search query refinements being selectable by a user via at least one first graphical object includes sending by the search engine to the client application instructions for displaying a first plurality of buttons selectable by a user, each button in the first plurality of buttons corresponding to one of the first suggested search query refinements and including text representative of that suggested search query refinement.

In some further implementations, the instructions sent by the search engine include instructions to display a visual indication that a button was selected. Thus, in some implementations, sending by the search engine to the client application the first refined search results and instructions for displaying at least one first refined search result and a visual representation of a refinement relationship between the first search query and the first refined search query includes sending by the search engine to the client application instructions for displaying a visual indication that a button from the first plurality of buttons has been selected.

There are many other well-known types of graphical objects via which the user could make a selection of a suggested search query refinement in various implementations. The following is a non-exhaustive list:
- a list box, each item in the list corresponding to a suggested search query refinement;
- a drop-down list, each item in the list corresponding to a suggested search query refinement;
- a plurality of radio buttons, each radio button corresponding to a suggested search query refinement;
- an expandable tree, each node in the tree corresponding to a suggested search query refinement; and
- a three-dimensional object that can be rotated by the user to reveal its various faces, each face corresponding to a suggested search query refinement or a plurality of suggested search query refinements.

Thus, in some further implementations, the search engine may send to the client application instruction for displaying one or more such graphical objects, allowing a user to select one or more suggested search query refinements by interacting appropriately with those one or more graphical objects.

In some implementations, the search engine effects a second refined search and provides the corresponding search results to the client application. Thus, in some implementations, the search engine effects a second refined search in respect of the second refined search query yielding second refined search results and sends to the client application the second refined search results and instructions for displaying at least one second refined search result and a visual representation of a refinement relationship between the first search query and the second refined search query. In some further implementations, the search engine receives from the client application a request to obtain the first refined search results after sending to the client application instructions for displaying the first suggested search query refinements and a request to obtain the second refined search results after sending to the client the first refined search results. Such requests may include the refined search query in question or other information allowing the search engine to recognize that the client application is requesting search results in respect of the refined search query. In other implementations, the search engine sends the first refined search results and the second refined search results to the client application without having received a specific request to provide them.

In some implementations, the search engine further sends to the client application instructions for displaying, concurrently with the visual representation of a refinement relationship between the first search query and the second refined search query, a visual indication that the at least one first refined search result was displayed before the at least one second refined search result was displayed. As a non-limiting example, the client application may be provided with instructions to display a graphical object or a portion of a graphical object associated with the first refined search query with a different color, size, or font than those of graphical objects or portions of graphical objects associated with refined search queries in respect of which refined search results were not displayed before the second refined search results were displayed.

In some implementations, the search engine sends, along with the first search results and the first suggested search query refinements, instructions for displaying buttons selectable by the user to make a selection of a first suggested search query refinement. Thus, in some implementations, sending by the search engine to the client application the first search results, first suggested search query refinements, each of the first suggested search query refinements corresponding to a refined search query including the at least one first search term and at least one additional search term, and instructions for displaying at least one first search result and, apart from a search bar, the first suggested search query refinements, the first suggested search query refinements being selectable by a user via at least one first graphical object includes sending by the search engine to the client application instructions for displaying a first plurality of buttons selectable by a user, each button in the first plurality of buttons corresponding to one of the first suggested search query refinements and including text representative of that suggested search query refinement.

In some further implementations, the search engine sends to the client application instructions for displaying visual indications of button selections. Thus, in some implementations:
- sending by the search engine to the client application the first refined search results and instructions for displaying at least one first refined search result and a visual representation of a refinement relationship between the first search query and the first refined search query includes sending by the search engine to the client application instructions for displaying a visual indication that a first button from the first plurality of buttons has been selected; and
- sending by the search engine to the client application the second refined search results and instructions for displaying at least one second refined search result and a visual representation of a refinement relationship between the first search query and the second refined search query includes sending by the search engine to the client application instructions for displaying a visual indication that a second button from the first plurality of buttons has been selected.

In some further implementations, the search engine sends to the client application instructions for displaying, concurrently with the visual indication that the second button has been selected, a visual indication that the first button was selected before the second button was selected.

In other further implementations, the search engine may send to the client application instruction for displaying one or more of another well-known type of graphical objects, allowing a user to select one or more suggested search query refinements by interacting appropriately with those one or more graphical objects. Examples of well-known types of graphical objects include list boxes, drop-down lists, radio buttons, expandable trees, and three-dimensional objects with multiple faces.

In some implementations, the search engine further sends to the client application instructions for displaying second suggested search query refinements selectable by the user via one or more graphical objects in order to further refine the search query. The resulting further-refined search query includes the search terms of the first refined search query as well as additional terms that further refine the search. Thus in some implementations, the search engine further effects a second refined search in respect of the second refined search query yielding second refined search results and sends to the client application the second refined search results and instructions for displaying at least one second refined search result and a visual representation of a refinement relationship between the first search query and the second refined search query. In some further implementations, the search engine receives from the client application a request to obtain the first refined search results after sending to the client application instructions for displaying the first suggested search query refinements and a request to obtain the further-refined search results after sending to the client application instructions for displaying the second suggested search query refinements. Such requests may include the first refined search query or the further-refined search query, as the case may be, or other information allowing the search engine to recognize that the client application is requesting search results in respect of the first refined search query or the further-refined search query. In other implementations, the search engine sends the first refined search results and the further-refined search results to the client application without having received a specific request to provide them.

In some implementations, the search engine sends to the client application instructions for displaying a second set of buttons via which the user may make a selection of a further refinement of the first search query by selecting a button corresponding to a further-refined search query. Thus, in some implementations:

sending by the search engine to the client application the first search results, first suggested search query refinements, each of the first suggested search query refinements corresponding to a refined search query including the at least one first search term and at least one additional search term, and instructions for displaying at least one first search result and, apart from a search bar, the first suggested search query refinements, the first suggested search query refinements being selectable by a user via at least one first graphical object includes sending by the search engine to the client application instructions for displaying a first plurality of buttons selectable by a user, each button in the first plurality of buttons corresponding to one of the first suggested search query refinements and including text representative of that suggested search query refinement; and sending by the search engine to the client application second suggested search query refinements, each of the second suggested search query refinements corresponding to a further-refined search query including the at least one first search term, the at least one first additional search term, and at least one further additional search term, and instructions for displaying, apart from the search bar and apart from the first suggested search query refinements, the second suggested search query refinements, the second suggested search query refinements being selectable by a user via at least one second graphical object includes sending by the search engine to the client application instructions for displaying, apart from the first plurality of buttons, a second plurality of buttons selectable by a user, each button in the second plurality of buttons corresponding to one of the second suggested search query refinements and including text representative of that suggested search query refinement.

In some further implementations, the search engine sends to the client application instructions for displaying a visual indication of the buttons having been selected. Thus, in some implementations:

sending by the search engine to the client application the first refined search results and instructions for displaying at least one first refined search result and a visual representation of a refinement relationship between the first search query and the first refined search query includes sending by the search engine to the client application instructions for displaying a visual indication that a button from the first plurality of buttons has been selected; and sending by the search engine to the client application the further-refined search results and instructions for displaying at least one further-refined search result and a visual representation of a refinement relationship between the first search query, the first refined search query, and the further-refined search query includes sending by the search engine to the client application instructions for displaying a visual indication that a button from the second plurality of buttons has been selected.

In other further implementations, the search engine may send to the client application instruction for displaying one or more of another well-known type of graphical objects, allowing a user to select one or more suggested search query refinements or further refinements by interacting appropriately with those one or more graphical objects. Examples of well-known types of graphical objects include list boxes, drop-down lists, radio buttons, expandable trees, and three-dimensional objects with multiple faces.

In some implementations, the search engine sends to the client application instructions for displaying, in the search bar, the search terms of a tentative refined search query corresponding to a tentative selection of a suggested search query refinement received from a user. This allows the client application to provide feedback to the user allowing him or her to see the search query in respect of which search results would be displayed if he or she were to select a particular suggested search query refinement. Thus, in some implementations, sending by the search engine to the client application the first search results, first suggested search query refinements, each of the first suggested search query refinements corresponding to a refined search query including the at least one first search term and at least one additional search term, and instructions for displaying at least one first search result and, apart from a search bar, the first suggested search query refinements, the first suggested search query refinements being selectable by a user via at least one first graphical object includes sending by the search engine to the client application instructions for displaying in the search bar, upon receiving from a user via the at least one first graphical object a tentative selection of one of the first suggested search query refinements, a tentative refined search query corresponding to the tentative selection, the tentative refined search query including the at least one first search term and at least one tentative additional search term.

In some implementations, the tentative selection of a suggested search query refinement is made when a user places a pointer over a corresponding button. Thus, in some implementations, sending by the search engine to the client application the first search results, first suggested search query refinements, each of the first suggested search query refinements corresponding to a refined search query including the at least one first search term and at least one additional search term, and instructions for displaying at least one first search result and, apart from a search bar, the first suggested search query refinements, the first suggested search query refinements being selectable by a user via at least one first graphical object includes:

sending by the search engine to the client application instructions for displaying a first plurality of buttons selectable by a user, each button in the first plurality of buttons corresponding to one of the first suggested search query refinements and including text representative of that suggested search query refinement; and sending by the search engine to the client application instructions for displaying in the search bar, upon receiving an indication that a pointer controlled by a user is located over a button from the first plurality of buttons, a tentative refined search query corresponding to the tentative selection, the tentative refined search query including the at least one first search term and at least one tentative additional search term.

In other implementations, the search engine may send to the client application instruction for displaying one or more of another well-known type of graphical objects, allowing a user to select or tentatively select one or more suggested search query refinements by interacting appropriately with those one or more graphical objects. Examples of well-known types of graphical objects include list boxes, drop-down lists, radio buttons, expandable trees, and three-dimensional objects with multiple faces.

In some implementations, the first search query is entered by a user via the search bar, and the client application displays the first refined search query in the search bar when displaying one or more of the first refined search results. Thus, in some implementations, sending by the search engine to the client application the first refined search results and instructions for displaying at least one first refined search result and a visual representation of a refinement relationship between the first search query and the first refined search query includes sending by the search engine to the client application instructions for displaying the first refined search query in the search bar. In some further implementations, when a user tentatively cancels his or her selection of the first refined suggested search query refinement, the client application displays the first search query in the search bar in order to show the user that a cancellation of the first selection would lead the client application to display the first search results instead of the first refined search results. Thus, in some further implementations, sending by the search engine to the client application the first refined search results and instructions for displaying at least one first refined search result and a visual representation of a refinement relationship between the first search query and the first refined search query further includes sending by the search engine to the client application instructions for displaying in the search bar, upon receiving from a user via the at least one first graphical object a tentative cancellation of a selection of a suggested search query refinement corresponding to the first refined search query, the first search query in lieu of the first refined search query.

In some implementations a user carries out the first selection and the tentative cancellation of the first selection by selecting a button and placing a pointer over the button, respectively. Thus, in some implementations:

sending by the search engine to the client application the first search results, first suggested search query refinements, each of the first suggested search query refinements corresponding to a refined search query including the at least one first search term and at least one additional search term, and instructions for displaying at least one first search result and, apart from a search bar, the first suggested search query refinements, the first suggested search query refinements being selectable by a user via at least one first graphical object includes sending by the search engine to the client application instructions for displaying a first plurality of buttons selectable by a user, each button in the first plurality of buttons corresponding to one of the first suggested search query refinements and including text representative of that suggested search query refinement; and sending by the search engine to the client application the first refined search results and instructions for displaying at least one first refined search result and a visual representation of a refinement relationship between the first search query and the first refined search query further includes sending by the search engine to the client application instructions for displaying in the search bar, upon receiving an indication that a pointer controlled by a user is located over a button from the first plurality of buttons corresponding to the first refined search query, the first search query in lieu of the first refined search query.

In other implementations, the search engine may send to the client application instruction for displaying one or more of another well-known type of graphical objects, allowing a user to tentatively make, make, tentatively cancel, or cancel a selection of one or more suggested search query refinements by interacting appropriately with those one or more graphical objects. Examples of well-known types of graphical objects include list boxes, drop-down lists, radio buttons, expandable trees, and three-dimensional objects with multiple faces.

In some implementations, the search engine sends to the client application instructions for displaying, upon receiving from a user via the at least one first graphical object a cancellation of a selection of a suggested search query refinement corresponding to the first refined search query, the at least one first search result in lieu of the at least one first refined search result.

In some implementations, selecting a suggested search query refinement in respect of search results yields a filtered subset of those results. Thus, in some implementations, the first refined search results are a subset of the first search results. Likewise, in some implementations, the further-refined search results are a subset of the first refined search results. For example, the search engine could send to the client application, along with the first search results, an organization of the first search results into a plurality of groups of search results, each group corresponding to a respective first suggested search query refinement. Likewise, the search engine could send, in respect of at least one of the groups of search results, a plurality of subgroups of search results, each subgroup corresponding to a respective further-refined search query refinement.

In other implementations, the first refined search results are not a subset of the first search results, meaning, for example, that a refined search query "Rafael Nadal Tennis" may yield search results that were not included among the search results in respect of a first search query "Rafael Nadal", such as, for example, information relating to other tennis players or to tennis lessons being offered near the user's location.

In some implementations, the first search results are from a first database and the first refined search results are from a second database being different than the first database. As a non-limiting example, the first search may be effected using a database of links to web pages and the first refined search may be effected using a separate database containing only images, or music, or some other type of media.

Likewise, in some implementations, the first refined search results are from a first database and the second refined search results are from a second database being different than the first database. As a non-limiting example, the first refined search may be effected using a database containing images and the second refined search may be effected using a separate database containing movies.

In some implementations, the SSQRs are static categories of search results determined before the search engine receives the first search query from the client application. For example, in such implementations, the SSQRs may be determined based on properties of the search results, without regard to information about the first search query, the client application, the device or devices on which the client application is running, or the user of the client application.

In some implementations, the first suggested search query refinements and/or the second suggested search query refinements refer to different types of media. In such implementations, the search engine classifies Internet resources by type of media (such as movies, watching movies online, downloading movies, watching trailers, purchasing movies, music, downloading music, listening to music online, buying songs, pictures, biographies, news, weather, or geography), identifies one or more search term(s) representative of each category, and proposes for each category an SSQR associated with the search term(s) representative of the category.

In other implementations, the search engine determines the SSQRs based at least in part on information about the first search query. The search engine analyzes the first search query submitted by the user, determines a set of previous search queries related to the first search query, analyzes the results of those related queries, groups the results into categories based on information about the subsequent behavior of users having received those results, and determines, for each category, a suggested search query refinement being one or more search term(s) that, when added to the search term(s) of the first search query, would indicate to the search engine to provide search results belonging to the category. Thus, in some implementations, effecting by the search engine a first refined search in respect of a first refined search query including the at least one first search term and at least one first additional search term, the first refined search yielding first refined search results includes:
  determining by the search engine a plurality of groups of search results, each group of search results including at least one of the first search results; and
  determining for each group in the plurality of groups of search results at least one additional search term which, when added to the at least one first search term, composes a refined search query that targets the group.

In some implementations, the search engine determines the SSQRs based at least in part on information about the client application. As non-limiting examples, the SSQRs provided to a client application may be based at least in part on the type of client application, its language settings, its version number, or its historical usage.

In some implementations, the search engine determines the SSQRs based at least in part on information about the device or devices on which the client application is running.

In some implementations, the search engine determines the SSQRs based at least in part on information about the user of the client application. As non-limiting examples, the SSQRs may be based at least in part on the user's historical usage of the search engine, interaction with SERPs, browsing history, or actual or estimated demographic profile.

In the context of the present specification, a "client application" is a computer program that is running on appropriate digital electronic hardware and is capable of receiving information from a user, sending information to a search engine, receiving information from a search engine, and displaying information to a user. For example, the client application may run on a smartphone, tablet, laptop, desktop PC, or other device suitable for communicating with a search engine.

In the context of the present specification, a first device should be understood to be "in communication with" a second device if each of the devices is capable of sending information to and receiving information from the other device, across any physical medium or combinations of physical media, at any distance, and at any speed. As a non-limiting example, the search engine and the digital electronic device(s) on which the client application is running may communicate over a computer network such as the Internet. As another non-limiting example, the client application may run on the same digital electronic hardware as the search engine, in which case communication between the client application and the search engine may occur by any means available on such digital electronic hardware, such as inter-process communication.

In the present context a "search engine" should be understood to comprise the software elements or digital electronic devices necessary to carry out the functions of a search engine system. In various implementations of above aspects, the search engine may thus comprise any number of digital electronic devices.

In the context of the present specification, a "search query" is information that a search engine takes into account in respect of a search to be carried out in order to provide the user with the information that the user is seeking to obtain through the search. Each piece of information is an "element" of the search query. Search queries may include a variety of elements, including, but not limited to, one or more "search terms" (e.g. words, letters, numbers, characters, etc.), the IP address of the client device, the geographic location of the client device, the (presumed) language of the search term(s), a search account associated with the (presumed) user of the client device, and the application that the user is using on the client device in respect of the search. Although the user may or may not be aware of the various elements included within their search query, the inclusion of various elements helps to provide the user with the information that they are seeking to obtain through the search. In the present context no particular number or type of elements is generally required, although typically, the more elements provided to the search engine, the better the search results.

In the context of the present specification, a "search query refinement" is one or more search terms to be added to a search query in order to compose a refined search query. The present technology is not restricted to any particular method of interpreting the search query refinement with regard to the scope of search results. The search engine may interpret the addition of search terms as a narrowing of the search, such that the refined search results include only those results of the first search which also include the one or more search terms of the search query refinement; or the search engine may interpret the addition of search terms as a broadening of the search, such that the refined search results include both the results of the first search as well as other search results including only the one or more search terms of the search query refinement; or the search engine could interpret the addition of search terms in another way altogether.

It should be understood that not all search elements in respect of search need be sent by the client device to the search engine. For example, some elements may be determined by the search engine itself (or by some associated system), be it from the elements sent to the search engine, or otherwise. Other elements may be stored information retrieved by the search engine, or information derived from stored information retrieved by the server. In the context of the present specification, the "search results" are the results of a search performed by a search engine, irrespective of the manner in which those results were obtained. (There are many ways of carrying out a search, and the present technology is not restricted to any particular method.)

In the context of the present specification, a "search bar" is a text box into which search terms may be entered by a user. A search bar may be included in a search engine's web interface or as part of a client application's user interface.

In the context of the present specification, it should be understood that, while it is generally anticipated that the client application interacts with a "user" being a single person, nothing in the present specification should be interpreted to preclude the possibility that the user with whom the client application interacts could be a different person at different times. For example, one person may submit the first search query, and another person, perhaps a friend of the first person sharing the same computer terminal, could select a suggested search query refinement having been received from the search engine and displayed by the client application. As such, in every instance in which the client application either receives instruction from a user or displays information to a user, it is properly stated that the client application is interacting with "a user" rather than with some definite user with whom a previous interaction took place.

In the context of the present specification, a "visual representation of a refinement relationship" between a first search query and a second search query is any visual indication conveying to the user that the second search query is equivalent to a refined version of the first search query. For example, the refinement relationship could be indicated by displaying the search terms of the second search query in the search bar, wherein the search terms included in the first search query, being a subset of the search terms in the second search query, are displayed using a different color, font, or style. As another example, the refinement relationship could be indicated by displaying the search terms of the second search query in the search bar and, apart from the search bar, a graphical object comprising the search terms included in the second search query but not included in the first search query.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (pictures, movies, sound records, presentations etc.), data (location data, numerical data, etc.), text (opinions, comments, questions, messages, etc.), documents, spreadsheets, etc.

In the context of the present specification, the expression "instructions for displaying" includes any information which may be interpreted by its recipient as an indication that some content is to be displayed, as an indication as to the form in which some content is to be displayed, or both. As one skilled in the art would recognize, the degree of precision required in such instructions depends on the extent of any prior understanding about the interpretation to be given to information being exchanged as between the sender and the recipient of the instructions. For example, if it is understood prior to a communication between a search engine and a client application that the search engine will send to the client application certain information to be displayed in a particular form, then the mere sending of the content may constitute instructions for displaying that content. In the extreme, both the content and the form in which it is to be displayed are predetermined, in which case the "instructions for displaying" may consist merely of an indication that the predetermined content is to be displayed according to the predetermined form, without reference either to the particular content or to the particular form.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first graphical object" and "third graphical object" is not intended to imply any particular order, type, chronology, hierarchy or ranking (for example) of/between the graphical objects, nor is their use (by itself) intended imply that any "second graphical object" must necessarily exist in any given situation. Further, as is discussed herein in other contexts, reference to a "first" element and a "second" element does not preclude the two elements from being the same actual real-world element. Thus, for example, in some instances, a "first" graphical object and a "second" graphical object may be the same graphical object, and in other cases they may be different graphical objects.

In the context of the present specification, certain claim elements have been labeled with letters "(a)", "(b)", "(c)", etc. These labels have been used only for ease of reference to the claim elements to which they refer, and not for the purpose of describing any particular relationship between those claim elements. The alphabetical nature of these labels is not intended to necessarily imply any particular order, chronology, hierarchy or ranking between the claim elements. Thus, for example, depending on the implementation, it may be that a method claim element with the label "(h)" may occur before, after, or simultaneously with a method claim element with the label "(c)".

In the context of the present specification, the expression "component" is meant to include software (appropriate to a particular hardware context) that is both necessary and sufficient to achieve the specific function(s) being referenced.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present invention will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIGS. 14A to 14D show a flowchart representing a series of interactions between a client application and a search engine illustrating various aspects of the present technology.

DETAILED DESCRIPTION

Figure 1:
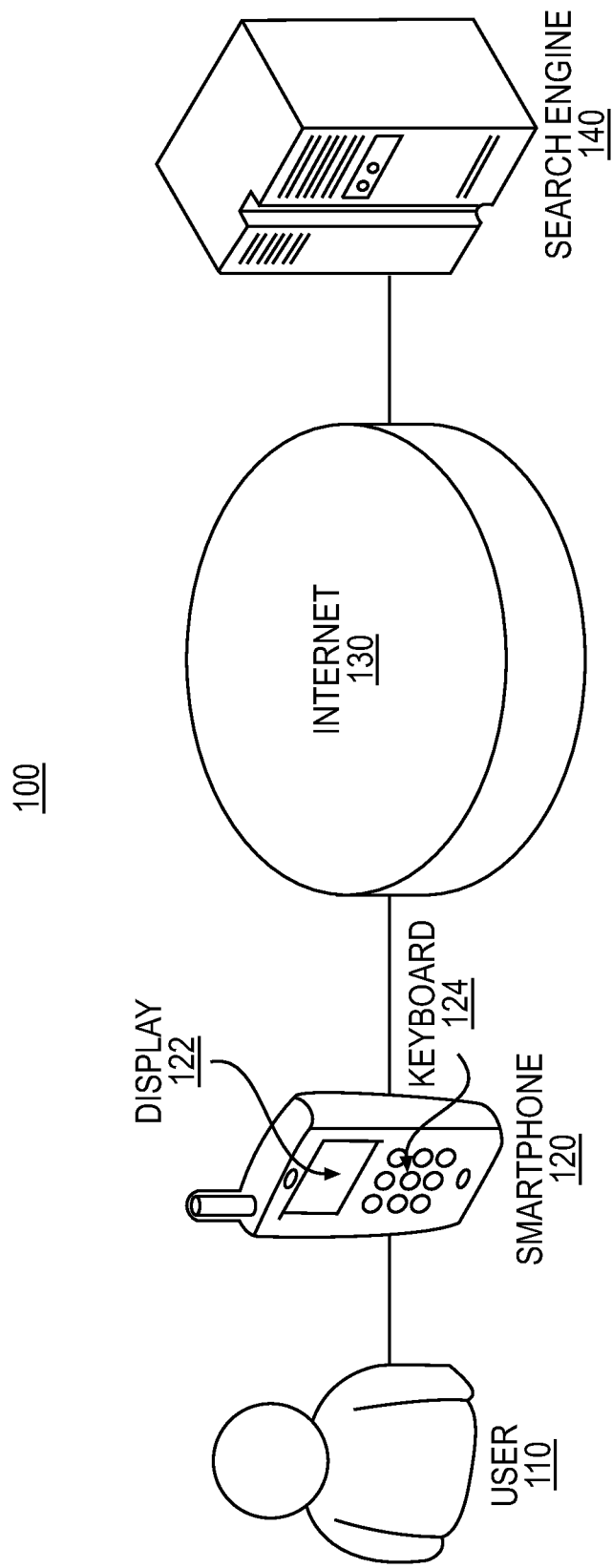
FIG. 1 is a context diagram of a computing environment suitable for use with implementations of the present technology described herein.

FIG. 1 shows a context diagram of a computing environment 100 suitable for use with implementations herein. A user 110 employs a smartphone 120 in communication with a search engine 140 via the Internet 130. The smartphone 120 has a keyboard 124 to receive text input from user 110 and a display 122 for rendering a browser interface 200 as described below with reference to FIG. 2. The search engine 140 performs some of the following tasks: indexes the web, keeps a database of indexed web pages, receives search queries, performs web searches, categorizes search results into different categories, categorizes search queries and matches them with the categories of search results, etc.

It is to be expressly understood that smartphone 120 and search engine 140 are merely implementations of the present technology. Thus, the descriptions thereof that follow are intended to be only illustrative examples of the present technology. These descriptions are not intended to define the scope or set forth the bounds of the present technology. In some cases, what are believed to be helpful examples of modifications to smartphone 120 and search engine 140 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case.

FIGS. 2 to 12 serve to illustrate a continuous series of transactions between user 110 and browser 200 being a client application running on smartphone 120. As one skilled in the art will understand, this particular series of transactions is merely illustrative of the behavior of a particular implementation of the present technology. A wide variety of other implementations could be implemented based on the description of the technology disclosed herein.

Figure 2:
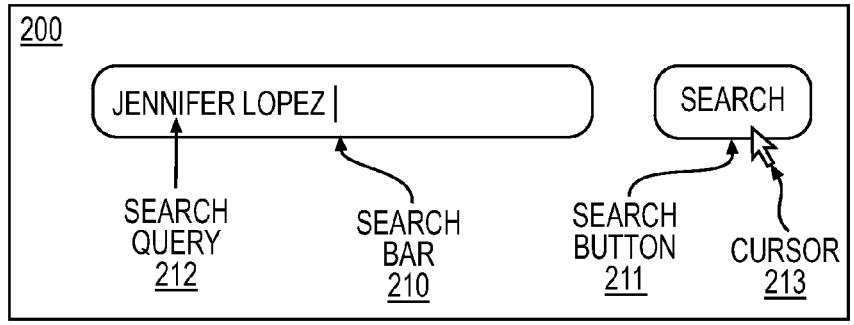
FIG. 2 is an example of a client application interface for entering a search query.

Beginning with FIG. 2, an implementation of a browser 200 is shown as it may appear on the display 122 of smartphone 120 (shown in FIG. 1). The browser 200 has a search bar 210 into which user 110 enters a search query 212 (e.g. "Jennifer Lopez") by typing on keyboard 124. The user 110 submits the search query 212 by clicking on a search button 211 using cursor 213 or by entering a keystroke such as the "Enter" key via keyboard 124. The browser 200 receives the search query 212 and the smartphone 120 sends it to the search engine 140 via the Internet 130. The search engine 140 effects a search yielding search results 230 (FIG. 3) and generates first suggested search query refinements and sends them to browser 200 running on smartphone 120. Optionally, in some implementations, at this time search engine 140 may also effect one or more additional searches yielding refined search results (such as the refined search results 250 and 270 of FIG. 7 and FIG. 12, respectively) in respect of refined search queries corresponding to the suggested search query refinements and send those refined search results to browser 200 along with search results 230. Optionally, in some implementations, at this time search engine 140 may also generate further suggested search query refinements (such as the further suggested search query refinements associated with the further refinement buttons 240 of FIG. 7) and effect additional searches yielding further-refined search results (such as the further-refined search results 260 of FIG. 9) in respect of the further-refined search queries corresponding to those further suggested search query refinements; and send the further-refined search results and the further suggested search query refinements to browser 200.

Figure 3:
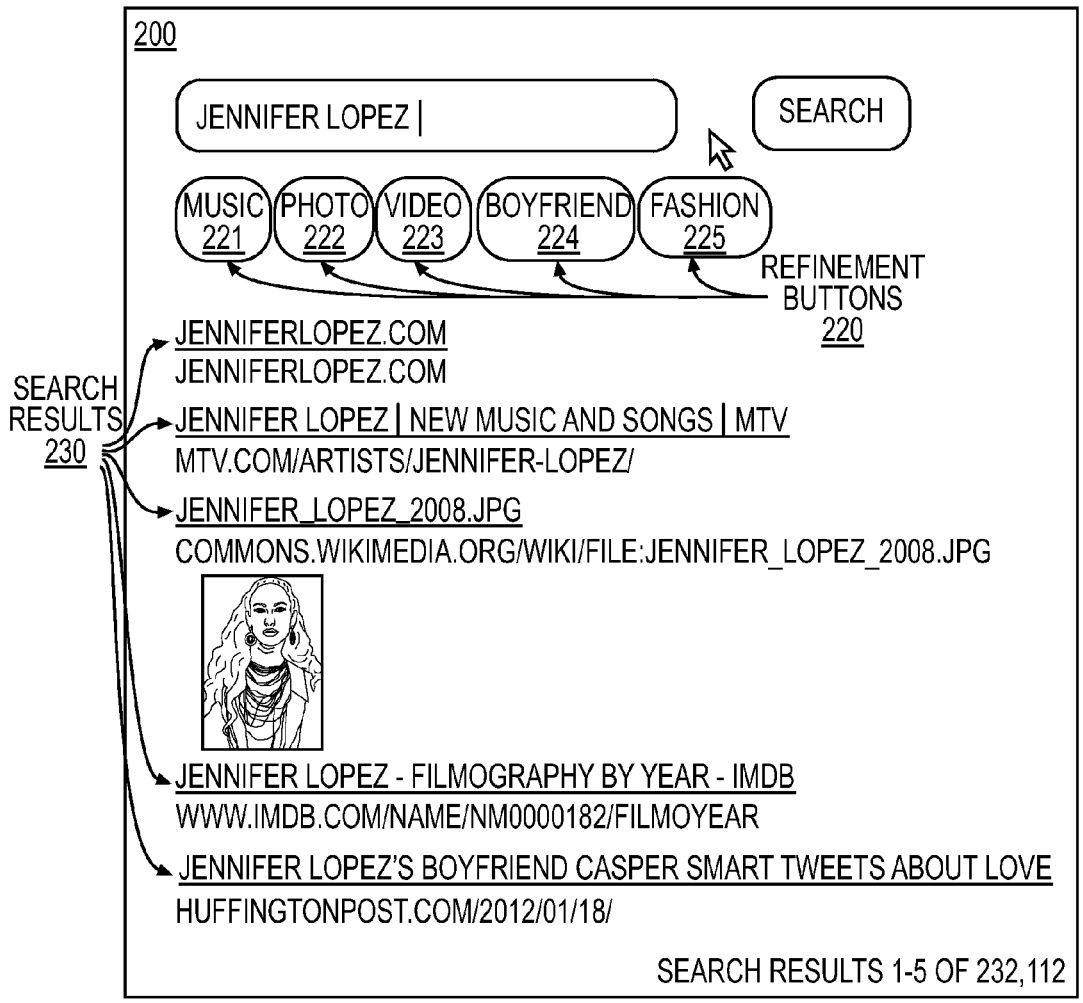
FIG. 3 is an example of a client application interface showing first search results in respect of the search query of FIG. 2 and first suggested search query refinements.

FIG. 3 shows search results 230 and suggested search query refinements 220 being displayed by browser 200. By interacting with browser 200, at this point user 110 could select one of the search results 230, enter a new search query in the search bar 210, or select one of the suggested search query refinements 220. The search results 230 in this exemplary implementation are a combination of links to web pages and images, but in various other implementations they could comprise any other type of search result.

Figure 4:
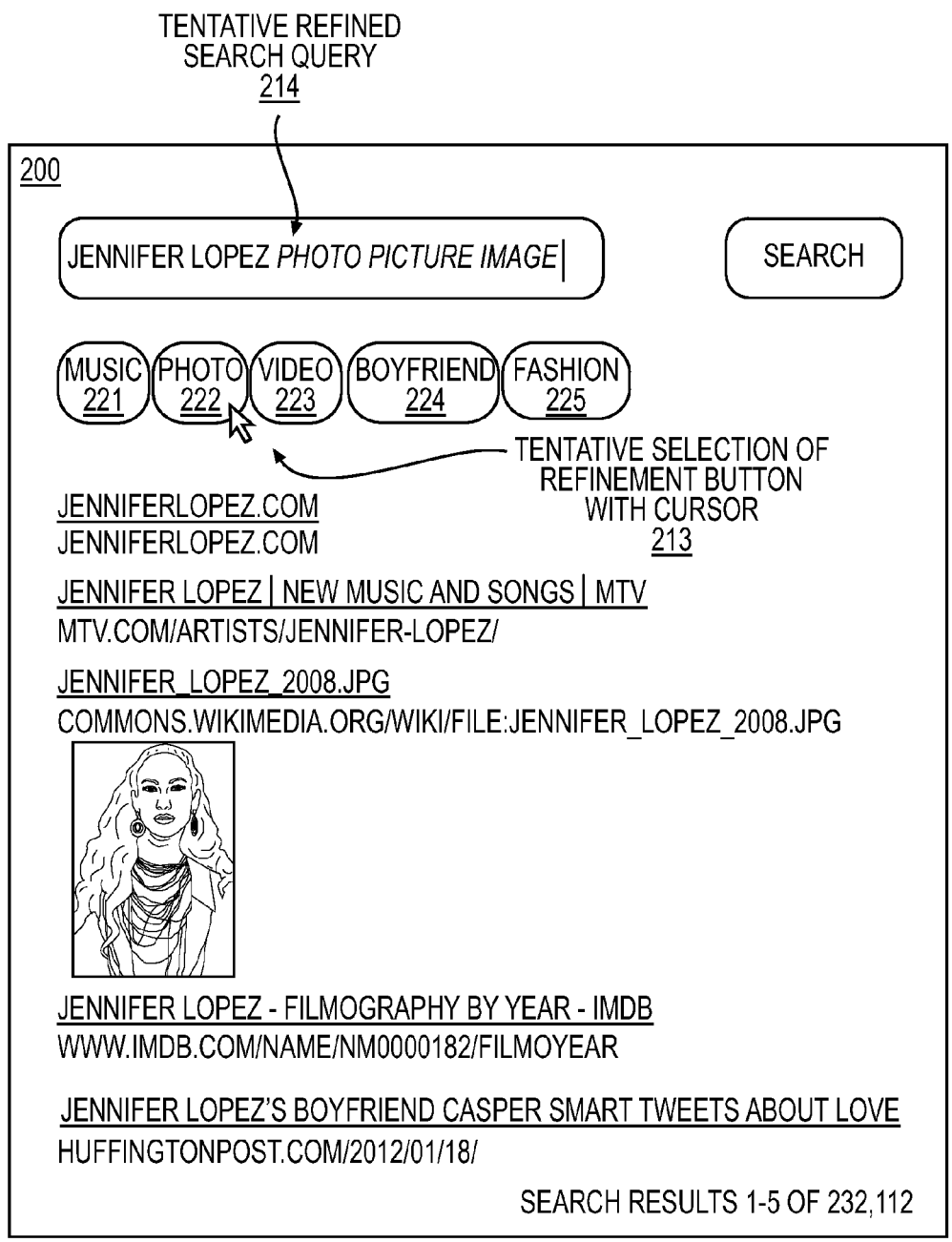
FIG. 4 is an example of a client application interface showing a tentative selection of a first suggested search query refinement.

FIG. 4 shows a tentative selection of a suggested search query refinement, which user 110 makes by placing cursor 213 over refinement button 222. The tentative refined search query 214 appears in search bar 210, composed of the search terms of the original search query 212 plus the search terms of the tentatively selected suggested search query refinement ("Photo Picture Image") corresponding to refinement button 222. User 110 thus receives a visual indication of the search query in respect of which search results would be displayed if he or she were to realize the selection of refinement button 222. In the implementation shown, the tentative additional search terms are displayed in italics to distinguish them from the search terms of the original search query 212. Note that refinement button 222 includes text ("Photo") representative of the corresponding SSQR ("Photo Picture Image"), without necessarily including all of its search terms.

Figure 5:
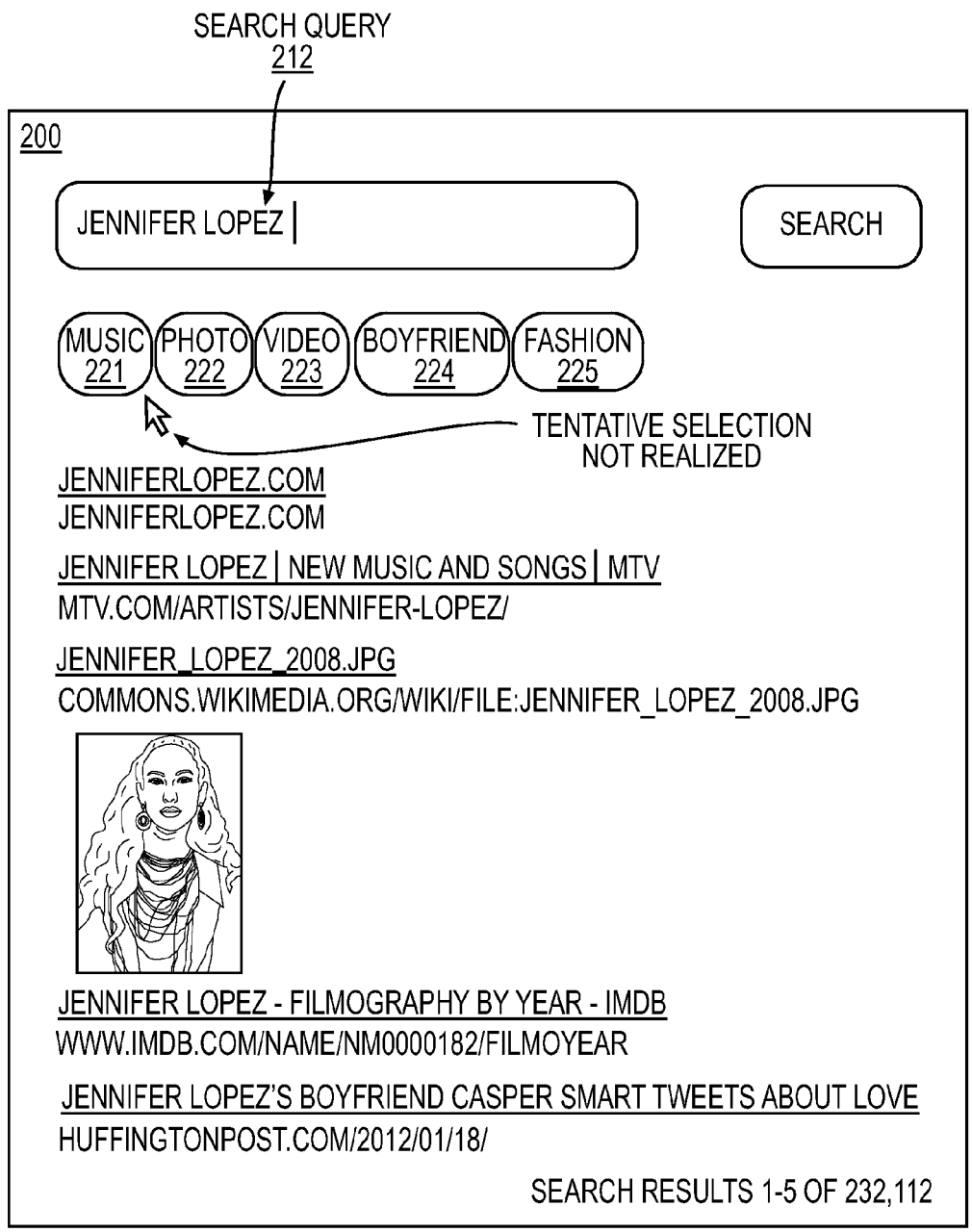
FIG. 5 is an example of a client application interface showing an unrealized tentative selection of a first suggested search query refinement.

FIG. 5 shows the state of browser 200 after user 110 has not realized selection of refinement button 222. After tentatively selecting refinement button 222 by placing cursor 213 over refinement button 222 as depicted in FIG. 4, user 110 has decided not to select refinement button 222 and has instead moved cursor 213 away from refinement button 222. Browser 200 provides feedback of the non-selection of refinement button 222 to the user by displaying anew search query 212 in search bar 210 in lieu of tentative refined search query 214.

Figure 6:
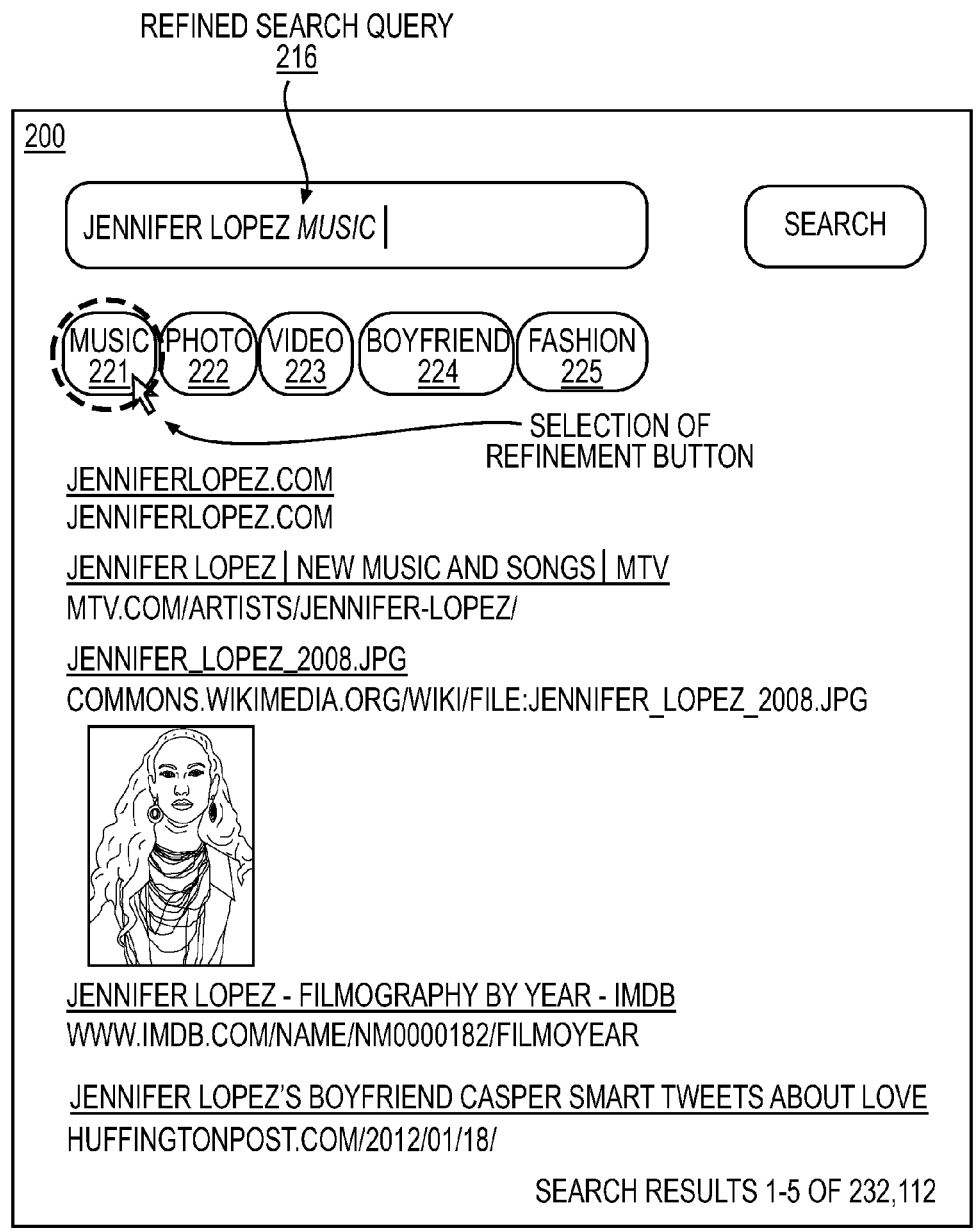
FIG. 6 is an example of a client application interface showing a selection of a first suggested search query refinement corresponding to a first refined search query.

FIG. 6 shows a selection of a suggested search query refinement, which user 110 makes by clicking on refinement button 221 ("Music"). In this implementation, the refined search query 216 ("Jennifer Lopez Music") corresponding to refinement button 221 is displayed in search bar 210 prior to the mouse click on refinement button 221, since the mouse being positioned over further refinement button 221 is a tentative selection analogous to the tentative selection of refinement button 222 described above with reference to FIG. 4. In other implementations that do not include the displaying of tentative refined search queries in the search bar, refined search query 216 may be displayed in search bar 210 only after refinement button 221 has been selected, or refined search query 216 may not be displayed in search bar 210 at all.

Figure 7:
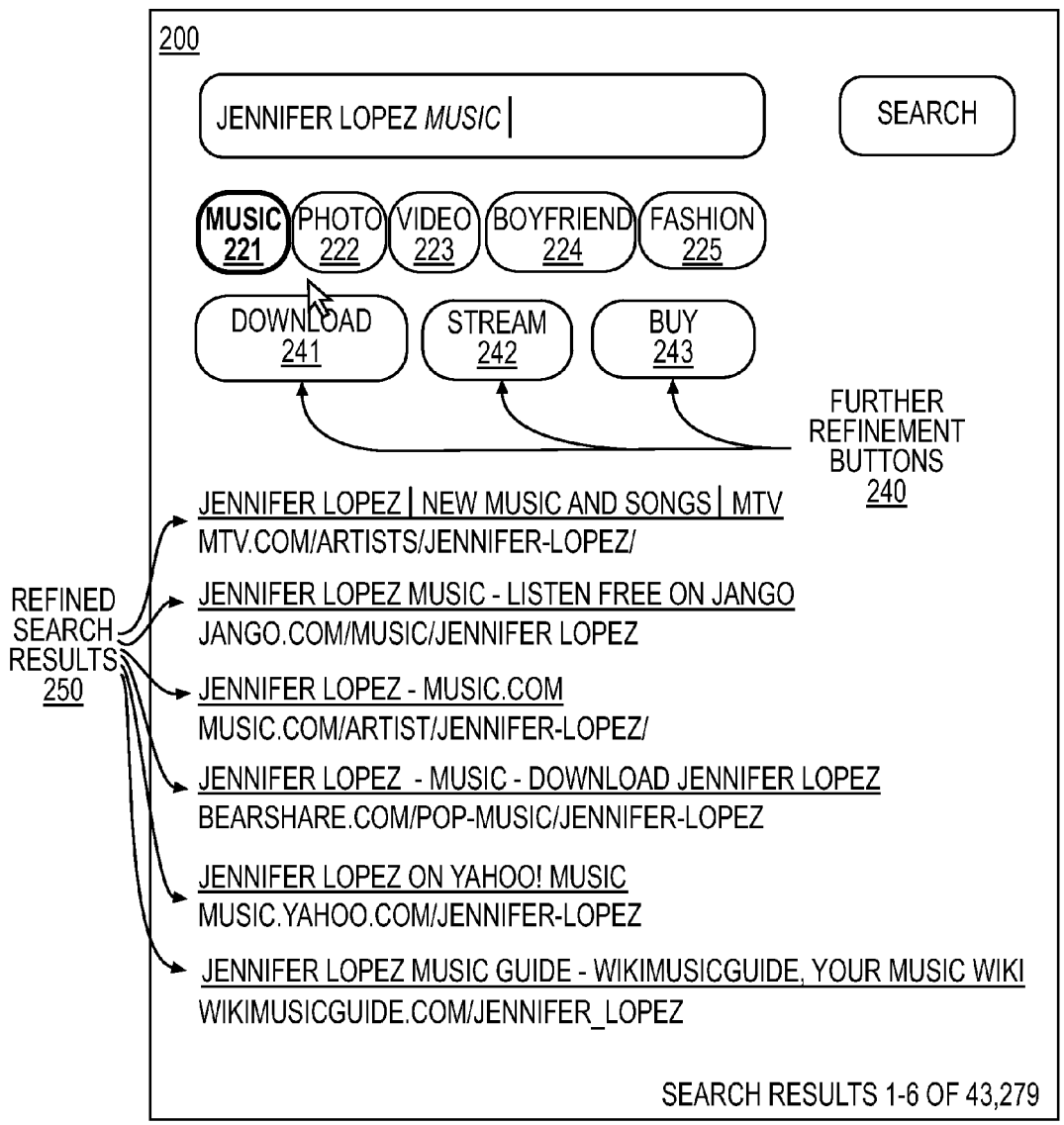
FIG. 7 is an example of a client application interface showing first refined search results in respect of the first refined search query of FIG. 6 and further suggested search query refinements.

In some implementations of the present technology, after receiving the selection of refinement button 221, browser 200 sends to search engine 140 a request to obtain refined search results 250 in respect of refined search query 216 ("Jennifer Lopez Music") (FIG. 7). In other implementations, browser 200 may have already obtained refined search results 250 from browser 200 in response to the original search query 212, as described above with reference to FIG. 2.

In this exemplary implementation, further suggested search query refinements are also received from search engine 140 by browser 200 along with the refined search results 250. In other implementations, no further suggested search query refinements are provided by search engine 140.

FIG. 7 shows refined search results 250 being displayed by browser 200. Along with search results 250, browser 200 also displays many other elements to assist user 110 to navigate through the universe of search results related to the original search query 212 ("Jennifer Lopez") and the refined search query 216 ("Jennifer Lopez Music"). A visual indication of a refinement relationship between the original search query 212 and the refined search query 216 is displayed by virtue of the search terms of refined search query 216 being displayed in search bar 210 along with a visual indication that refinement button 221 ("Music"), corresponding to the suggested search query refinement that was applied to search query 212, has been selected. In the present implementation, the selection of refinement button 221 is indicated by thickening its border and bolding its text label; however, any other visual indication of the prior selection of refinement button 221 could be employed. User 110 may thus visually apprehend the impact of the selection of refinement button 221 on the search query. In addition to the visual representation of user 110's search query refinement history, FIG. 7 also shows the displaying by browser 200 of further suggested search query refinements selectable by user 110 via the further refinement buttons 240.

Figure 8:
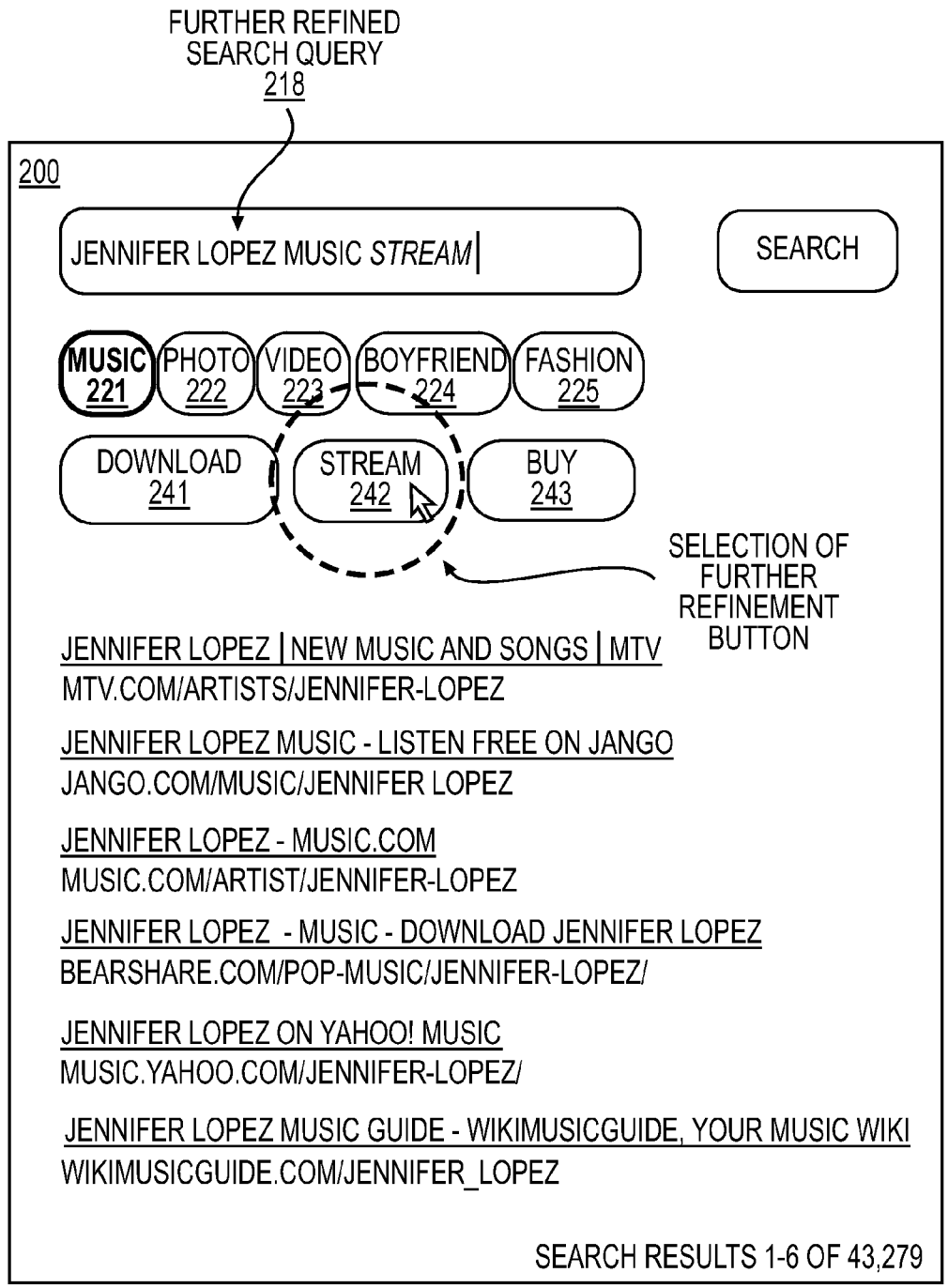
FIG. 8 is an example of a client application interface showing a selection of a further suggested search query refinement corresponding to a further-refined search query.

FIG. 8 shows a selection of a further suggested search query refinement, which user 110 makes by clicking on further refinement button 242 ("Stream"). In this implementation, the further-refined search query 218 ("Jennifer Lopez Music Stream") corresponding to further refinement button 242 is displayed in search bar 210 prior to the mouse click on further refinement button 242, since the mouse being positioned over further refinement button 242 is a tentative selection analogous to the tentative selection of refinement button 222 described above with reference to FIG. 4. In other implementations that do not include the displaying of tentative refined search queries in the search bar, further-refined search query 218 may be displayed in search bar 210 only after further refinement button 242 has been selected, or further-refined search query 218 may not be displayed in search bar 210 at all.

Figure 9:
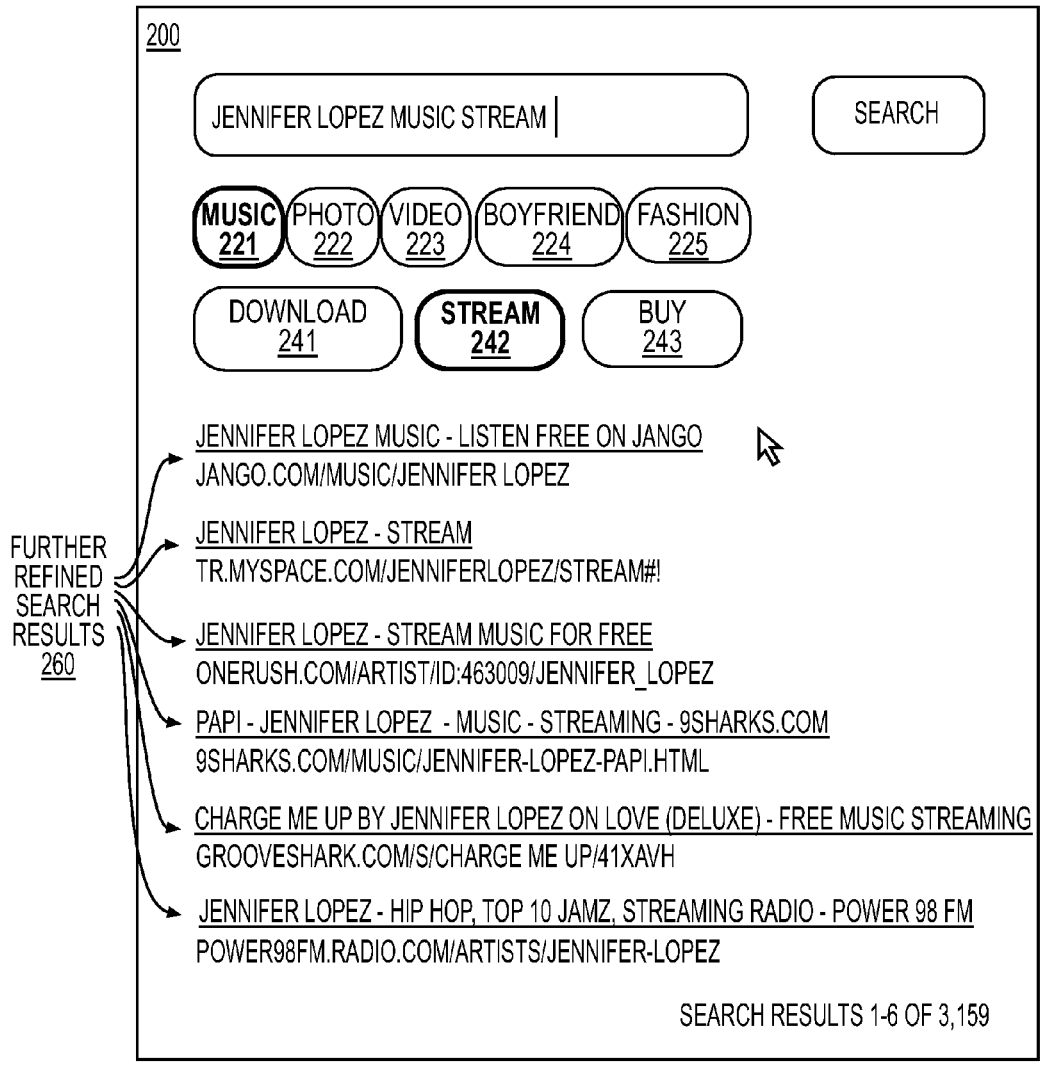
FIG. 9 is an example of a client application interface showing further-refined search results in respect of the further-refined search query of FIG. 9.

In some implementations of the present technology, after receiving the selection of further refinement button 242, browser 200 sends to search engine 140 a request to obtain further-refined search results 260 in respect of further-refined search query 218 (FIG. 9). In other implementations, browser 200 may have already obtained further-refined search results 260 from browser 200 in response to the original search query 212, as described above with reference to FIG. 2. In this exemplary implementation, no yet further suggested search query refinements (that is, suggested refinements of the further-refined search query) are provided by search engine 140; however, in various implementations, any number of additional degrees of refinement could be suggested by the search engine 140.

FIG. 9 shows further-refined search results 260 being displayed by browser 200. Along with search results 260, browser 200 also displays a visual indication of a refinement relationship between the original search query 212, the refined search query 216, and the further-refined search query 218 by displaying the search terms of further-refined search query 218 in search bar 210 along with visual indications of that refinement button 221 and further refinement button 242 have been selected. User 110 may thus visually apprehend his or her search query refinement history. In this exemplary implementation, no further suggested search query refinements are proposed to user 110 beyond the first two levels; in other implementations, a third (and fourth, and so on) level of suggested search query refinements may be presented to the user to allow for yet further refinement of the further-refined search query 218 "Jennifer Lopez Music Stream".

Figure 10:
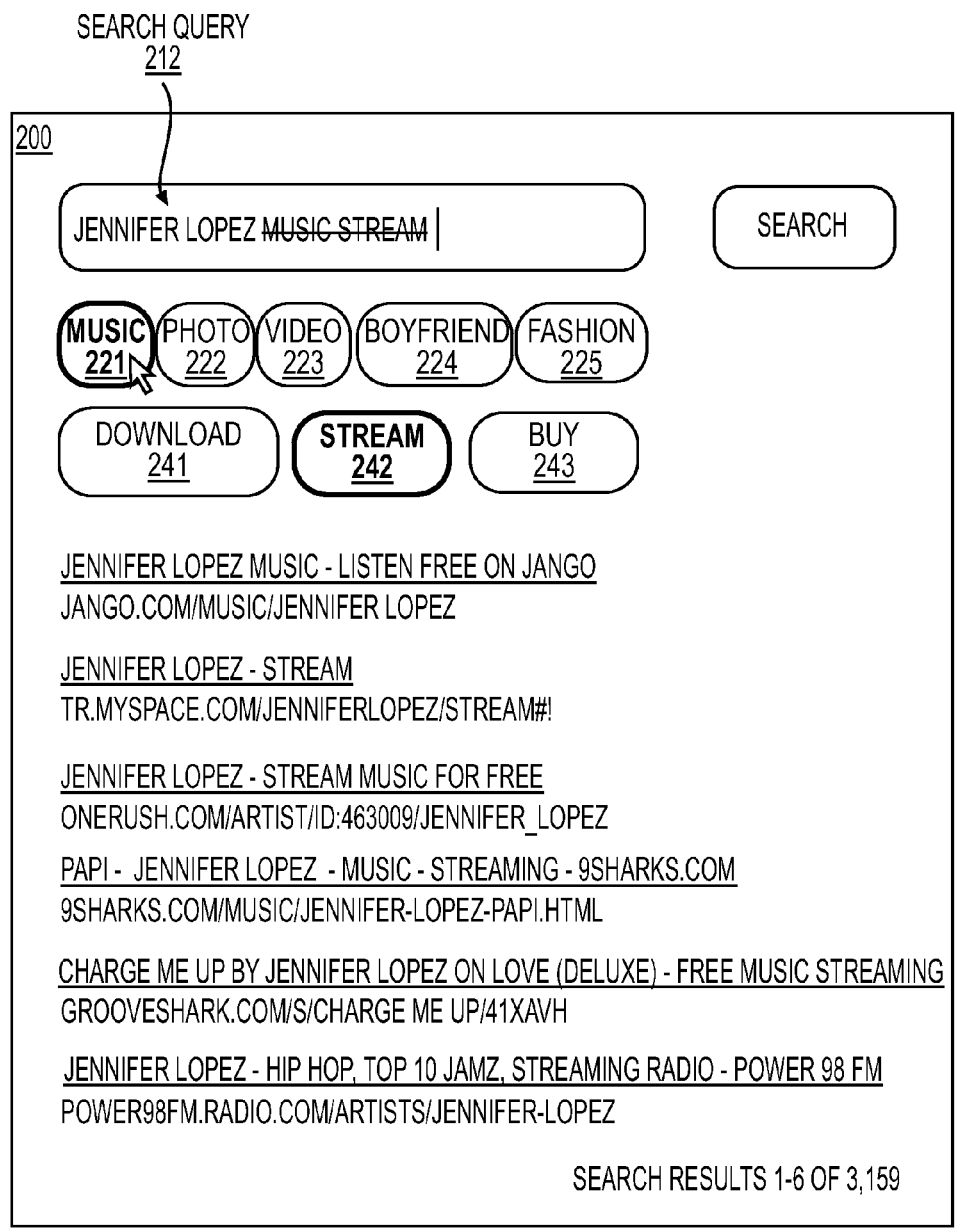
FIG. 10 is an example of a client application interface showing a tentative cancellation of the selection of the first suggested search query refinement of FIG. 6.

FIG. 10 shows a tentative cancellation of the suggested search query refinement previously selected by user 110 via refinement button 221 ("Music"), and the tentative cancellation by extension of the further suggested search query refinement selected by user via 100 via button 242 ("Stream"). In this exemplary implementation, a visual indication of the impact on the search query of realizing the cancellation is displayed in search bar 210 by striking out the search terms ("Music Stream") which are included in further-refined search query 218 ("Jennifer Lopez Music Stream") but not included in the search query that would result from the cancellation, i.e. the original search query 212 ("Jennifer Lopez"). In other implementations, the effect of the cancellation could be displayed in another manner, such as by removing the additional search terms ("Music Stream") entirely rather than striking them out.

Figure 11:
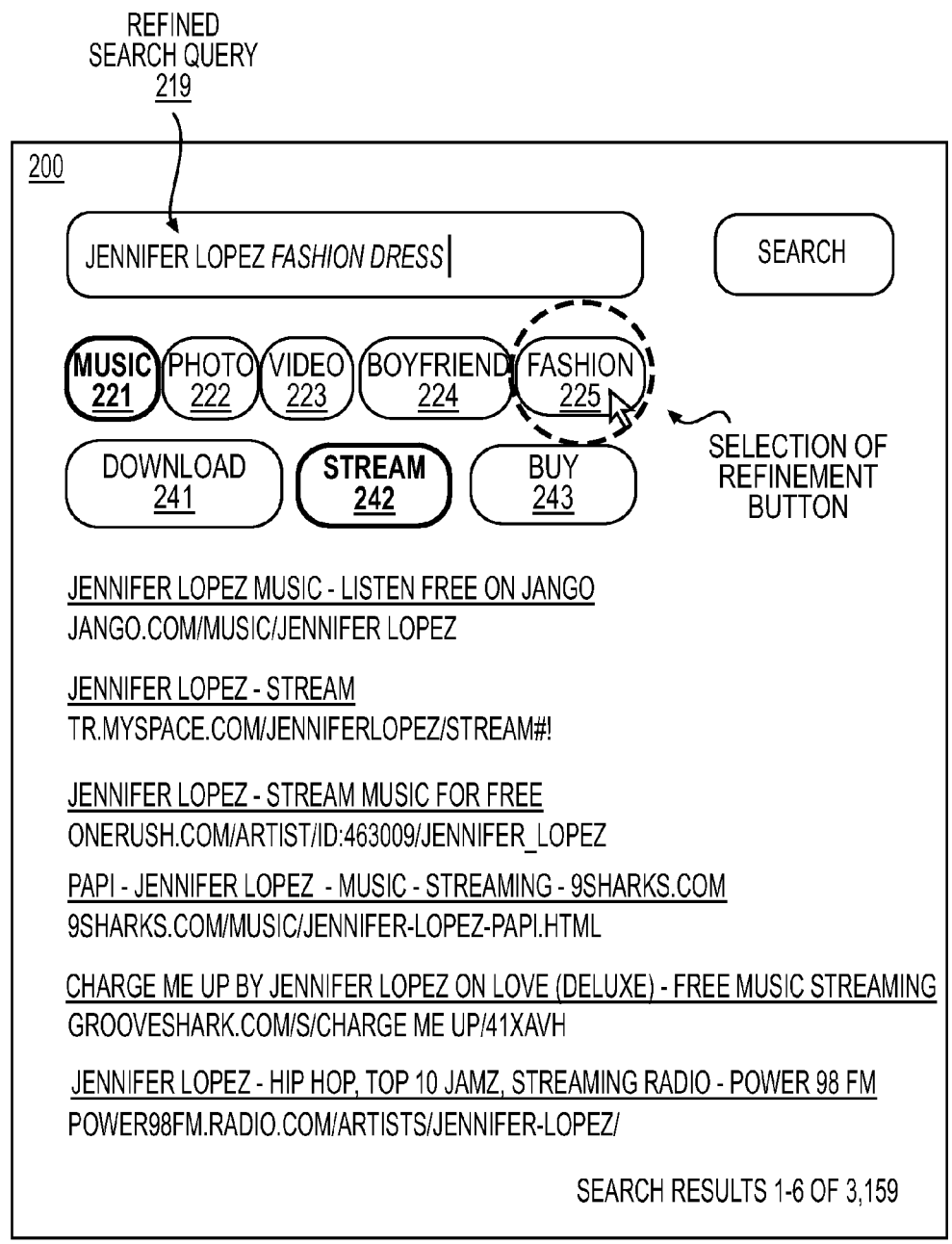
FIG. 11 is an example of a client application interface showing a selection of a second suggested search query refinement corresponding to a second refined search query.

FIG. 11 shows a selection of an alternative suggested search query refinement of original search query 212 corresponding to refined search query 219 ("Jennifer Lopez Fashion Dress"), which user 110 makes by clicking on refinement button 225 ("Fashion"). In this implementation, the refined search query 219 ("Jennifer Lopez Fashion Dress") corresponding to refinement button 225 is displayed in search bar 210 prior to the mouse click on refinement button 225, since the mouse being positioned over refinement button 225 is a tentative selection analogous to the tentative selection of refinement button 222 described above with reference to FIG. 4. In other implementations that do not include the displaying of tentative refined search queries in the search bar, refined search query 219 may be displayed in search bar 210 only after refinement button 225 has been selected, or refined search query 219 may not be displayed in search bar 210 at all.

In some implementations of the present technology, after receiving the selection of refinement button 225, browser 200 sends to search engine 140 a request to obtain refined search results 270 (FIG. 12) in respect of refined search query 219 ("Jennifer Lopez Fashion Dress"). In other implementations, browser 200 may have already obtained refined search results 270 from browser 200 in response to the original search query 212, as described above with reference to FIG. 2.

In this exemplary implementation, no further suggested search query refinements are received from search engine 140 by browser 200 along with the refined search results 270. In other implementations, further suggested search query refinements are provided by search engine 140.

Figure 12:
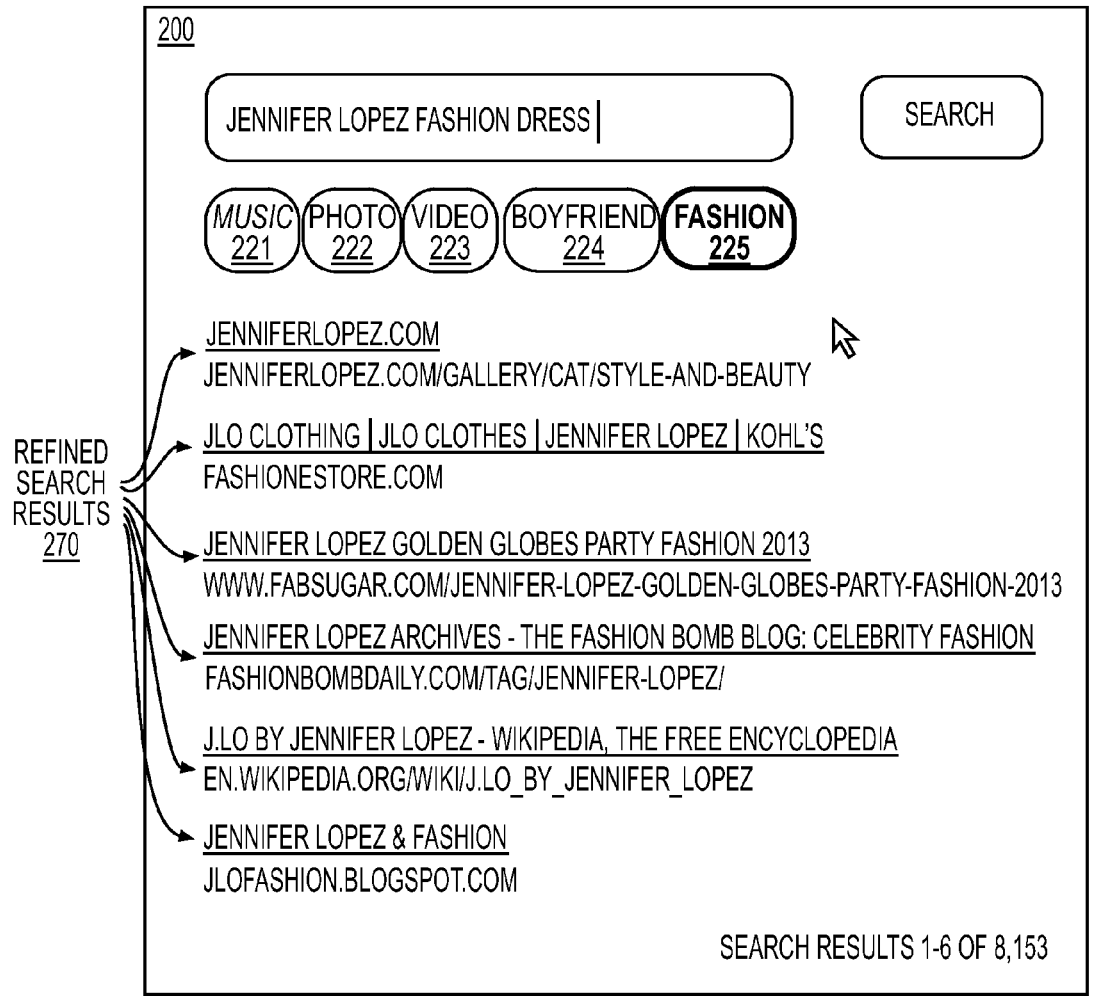
FIG. 12 is an example of a client application interface showing second refined search results in respect of the second refined search query of FIG. 11.

FIG. 12 shows refined search results 270 being displayed by browser 200. Along with search results 270, browser 200 also displays a visual representation of a refinement relationship between the original search query 212 and the refined search query 219 by displaying the search terms of refined search query 219 in search bar 210 along with a visual indication that refinement button 225 ("Fashion") has been selected, the selection of refinement button 225 operative to apply the corresponding suggested search query refinement to search query 212 so as to form refined search query 219. In the present implementation, the selection of refinement button 225 is indicated by thickening its border and bolding its text label, and a visual indication that refinement button 221 ("Music") was previously selected is indicated by displaying its text label in italics. The latter visual indication allows user 110 to quickly recognize that refined search results 250 in respect of refined search query 216 ("Jennifer Lopez Music") were displayed before search results 270 in respect of refined search query 219 ("Jennifer Lopez Fashion Dress") were displayed. In this exemplary implementation, there are no further refinement buttons to be displayed as no further suggested search query refinements in respect of refined search query 219 were received by browser 200 from search engine 140.

Figure 13:
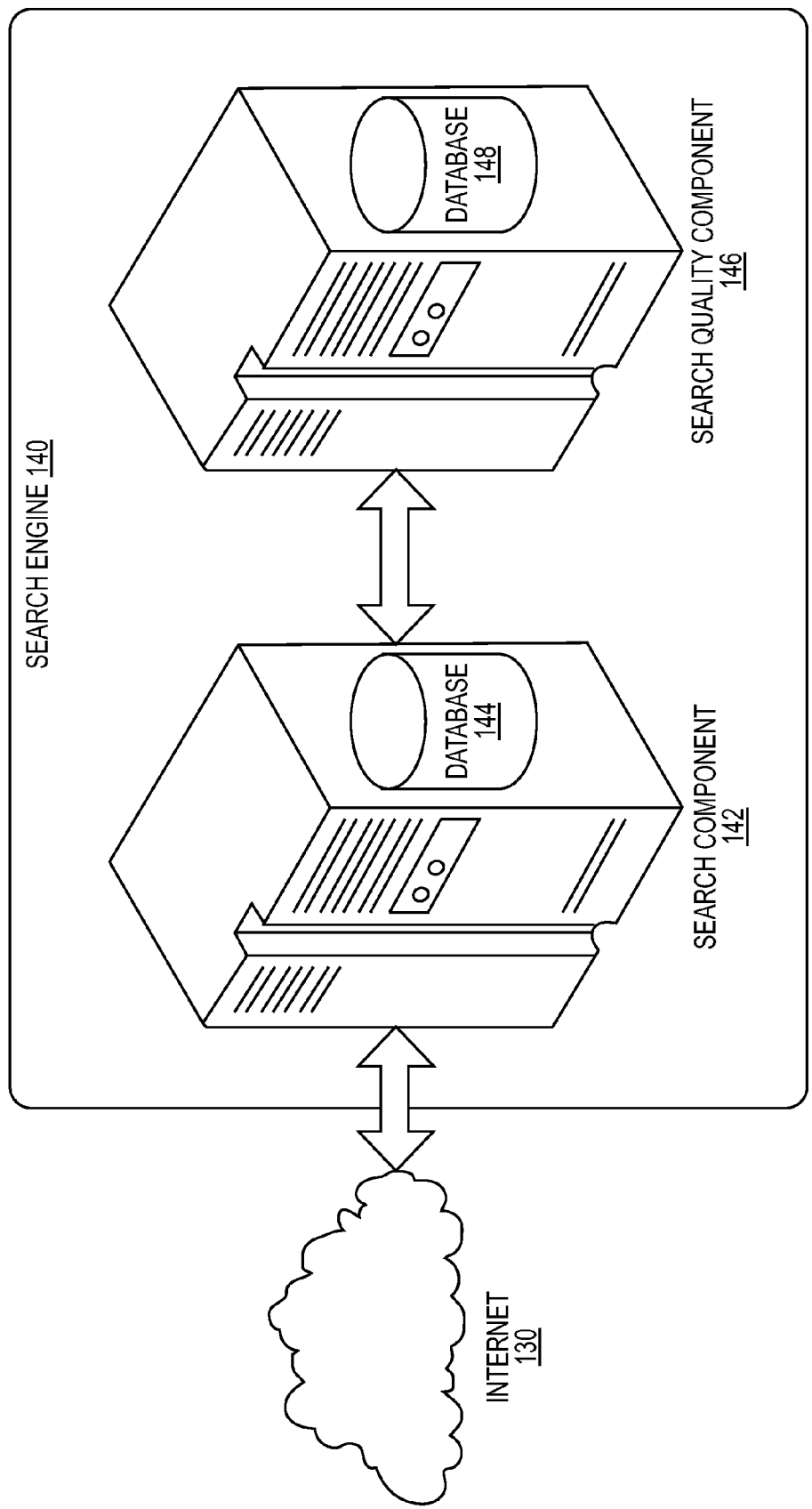
FIG. 13 is a high-level block diagram of a search engine system.

FIG. 13 is a block diagram of the search engine 140 in the environment of FIG. 1. The search engine 140 includes a search component 142, which includes a database 144 to store information about the search query being performed at a given time. Search component 142 is in communication with a search quality component 146 which maintains a database 148 for storing information used in the identification of suggested search query refinements related to the search query such as information about past search queries.

Each of search component 142, database 144, search quality component 146, and database 148 may be implemented wholly or in part in software hosted on any number of digital electronic devices, and wholly or in part in digital electronic circuitry, and may be composed of numerous hardware devices, including servers, wires, processors, etc., as well as software. In a typical implementation, search component 142 is either co-hosted with database 144 on a single computer or cluster of computers, or each is hosted on a separate computer or cluster of computers that is connected to the other via a low-latency network link. Search quality component 146 and database 148 are typically similarly connected so as to improve performance by reducing latency, as are search component 142 and search quality component 146.

Search component 142 performs the core search functions in respect of a search query, which may include receiving the search query, analyzing the search query, decomposing the query into search terms, identifying key search terms, and identifying marker terms (see below for more details). Search component 142 may also index Internet resources, store the index and associated data, search the index, group Internet resources into clusters, determine if a search query is targeting a cluster of Internet resources, and return a listing of relevant Internet resources to a user. Some of these functions of search component 142 are performed online and others are performed offline.

Search quality component 146 maintains an archive of information about past search queries in database 148, possibly including search terms, search results, statistics about user interactions with the search results such as the frequency with which each result was selected by the user after each search query, and statistics regarding related search terms such as the frequency with which various combinations of search terms appeared together. Search quality component 146 regularly receives updates from search component 142. The updates may contain information such as search terms included in search queries and the interactions of users with the SERPs returned by search engine 140 (i.e. links clicked among the search results, subsequent search queries).

Figure 14A:
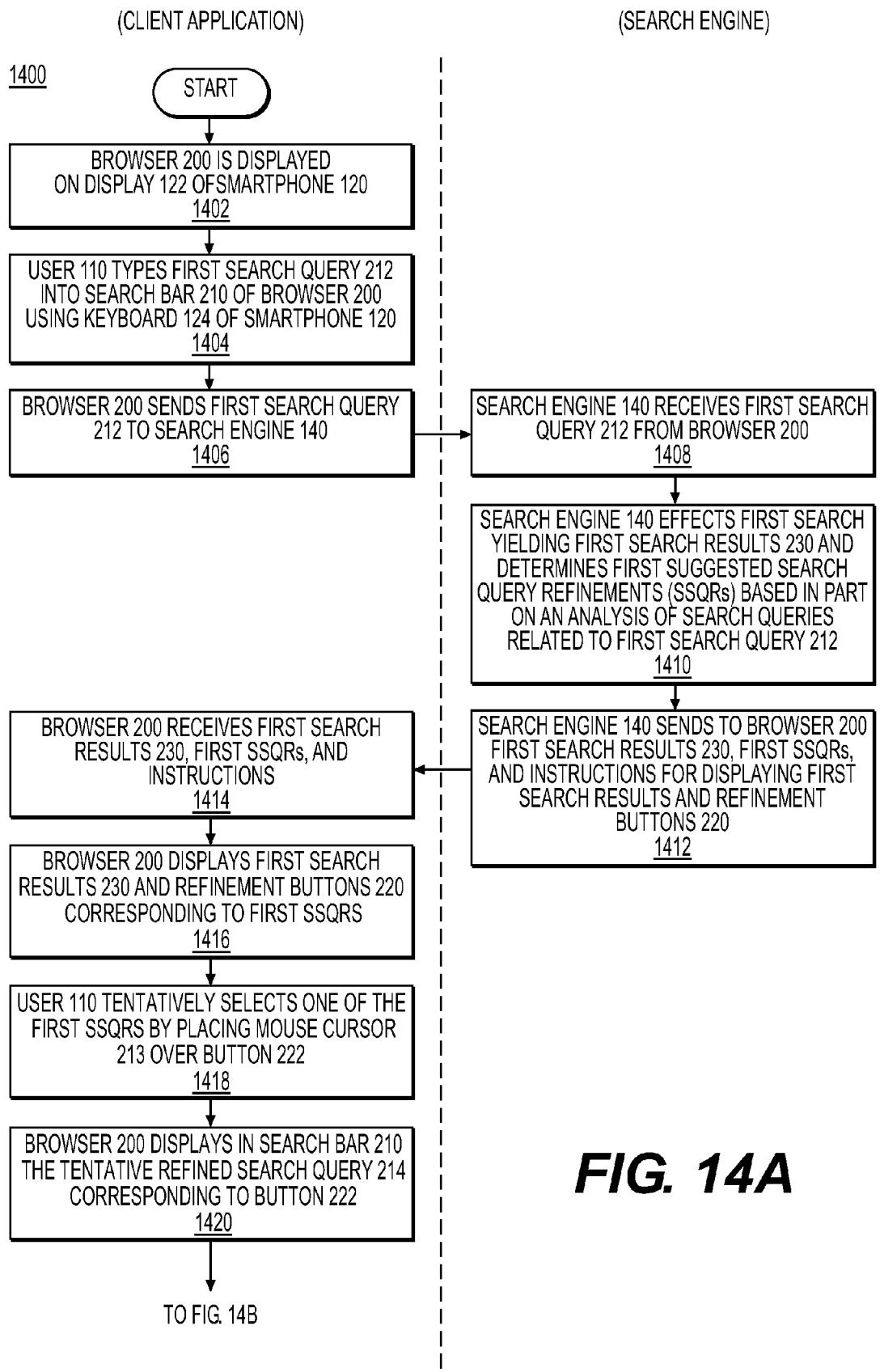
Figure 14C:
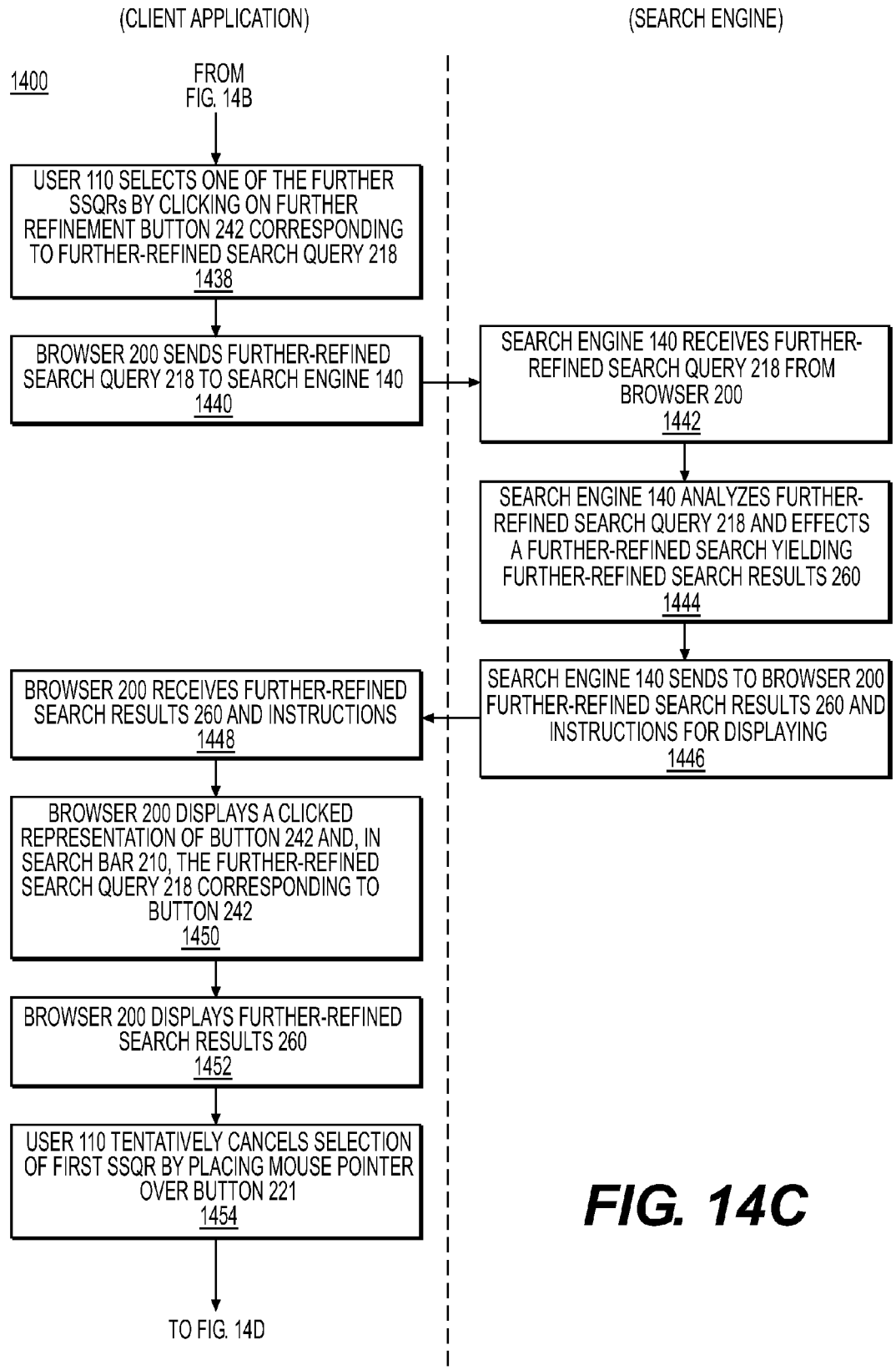
Figure 14D:
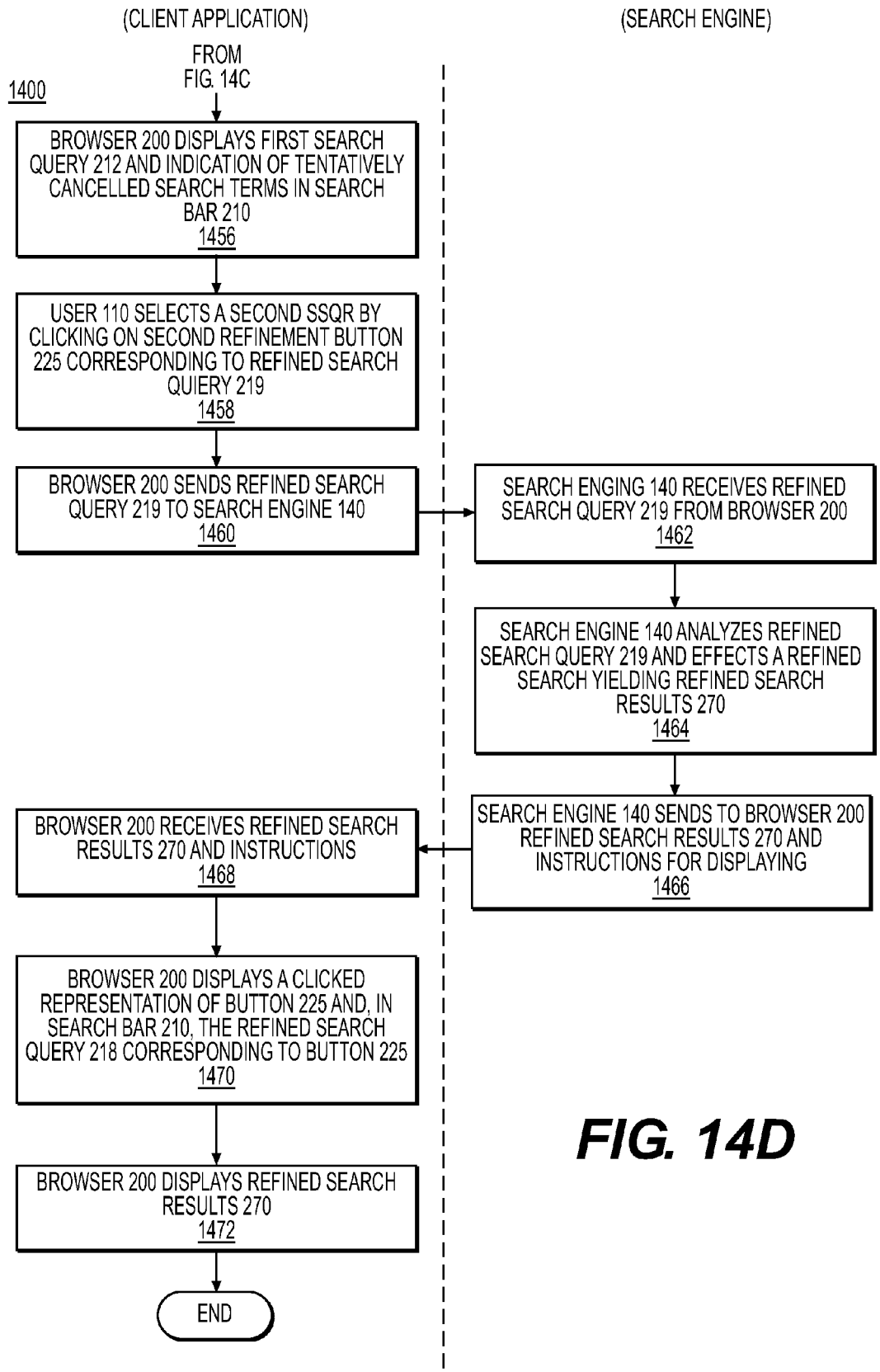

FIGS. 14A to 14D describe a series of steps performed by a client application implemented as browser 200 and a search engine 140. FIGS. 14B, 14C, and 14D are a continuation of FIG. 14A.

At step 1402, smartphone 120 displays browser 200 on its display 122. At step 1404, browser 200 receives first search query 212 including first search terms typed by user 110 into search bar 210 of smartphone 120 via keyboard 124. At step 1406, browser 200 sends first search query 212 to search engine 140.

At step 1408, search engine 140 receives first search query 212 from browser 200. At step 1410, search engine 140 analyzes first search query 212 to determine first suggested search query refinements (described in more detail below) and effects a first search in respect of first search query 212 yielding first search results 230. At step 1412, search engine 140 sends to browser 200 the first search results 230, the first suggested search query refinements, and instructions for displaying the first search results 230 and refinement buttons 220 corresponding to the first suggested search query refinements. In some implementations, the instructions for displaying the refinement buttons 220 include instructions for displaying a visual indication that a button has been selected upon being selected by user 110. In some implementations, the instructions include instructions for displaying a visual representation of a refinement relationship between first search query 212 and the respective refined search queries corresponding to the refinement buttons 220.

At step 1414, browser 200 receives the first search results 230, the first SSQRs, and the instructions for displaying the first search results 230 and the refinement buttons 220. At step 1416, browser 200 displays at least one of the first search results 230 and the refinement buttons 220. At step 1418, browser 200 receives a tentative selection of one of the first SSQRs when user 110 places a mouse cursor 213 over refinement button 222. At step 1420, browser 200 displays a tentative refined search query 214 corresponding to refinement button 222 in search bar 210. At step 1422, browser 200 receives a selection of one of the first SSQRs when user 110 clicks on refinement button 221 corresponding to refined search query 216. At step 1424, browser 200 sends refined search query 216 to search engine 140 in a request to obtain refined search results 250.

At step 1426, search engine 140 receives refined search query 216 in a request to obtain search results 250. At step 1428, search engine 140 analyzes refined search query 216 to determine further SSQRs (as described below) and effects a first refined search in respect of refined search query 216 yielding refined search results 250. At step 1430, search engine 140 sends to browser 200 the refined search results 250, the further SSQRs, and instructions for displaying the refined search results 250 and further refinement buttons 240 corresponding to the further SSQRs. In some implementations, the instructions for displaying the further refinement buttons 240 include instructions for displaying a visual indication that a button has been selected upon being selected by user 110. In some implementations, the instructions include instructions for displaying a visual representation of a refinement relationship between first search query 212 and refined search query 216. In some implementations, the instructions include instructions for displaying a visual representation of a refinement relationship between first search query 212, refined search query 216, and the respective further-refined search queries corresponding to the further-refinement buttons 240.

At step 1432, browser 200 receives from search engine 140 the refined search results 250, the further SSQRs, and instructions for displaying the refined search results 250 and the further refinement buttons 240. At step 1434, browser 200 displays a clicked representation of button 221 and, in search bar 210, the refined search query 216 corresponding to button 221. This serves as a visual representation of a refinement relationship between first search query 212 and refined search query 216. At step 1436, browser 200 displays at least one of the refined search results 250 and the further refinement buttons 240 corresponding to the further SSQRs. At step 1438, browser 200 receives a selection of a further SSQR when user 110 clicks on further refinement button 242 corresponding to further-refined search query 218. At step 1440, browser 200 sends further-refined search query 218 to search engine 140 in a request to obtain further-refined search results 260.

At step 1442, search engine 140 receives further-refined search query 218 in a request to obtain search results 260. At step 1444, search engine 140 analyzes further-refined search query 218 and effects a further-refined search in respect of further-refined search query 218 yielding further-refined search results 260. At step 1446, search engine 140 sends to browser 200 the further-refined search results 260 and instructions for displaying the further-refined search results 260. In some implementations, the instructions include instructions for displaying a visual representation of a refinement relationship between first search query 212, refined search query 216, and further-refined search query 218.

At step 1448, browser 200 receives from search engine 140 the further-refined search results 260 and instructions for displaying the further-refined search results 260. At step 1450, browser 200 displays clicked representation of button 221, a clicked representation of button 242 and, in search bar 210, the further-refined search query 218 corresponding to button 242. This serves as a visual representation of a refinement relationship between first search query 212, refined search query 216, and further-refined search query 218. At step 1452, browser 200 displays at least one of the further-refined search results 260. At step 1454, browser 200 receives a tentative cancellation of the first SSQR when user places cursor 213 over refinement button 221. At step 1456, browser 200 displays in search bar 210 the first search query 212 and an indication of the tentatively cancelled search terms. At step 1458, browser 200 receives a selection of a second, alternative SSQR when user 110 clicks on refinement button 225 corresponding to refined search query 219. At step 1460, browser 200 sends refined search query 219 to search engine 140 in a request to obtain refined search results 270.

At step 1462, search engine 140 receives refined search query 219 in a request to obtain search results 270. At step 1464, search engine 140 analyzes refined search query 219 and effects a refined search in respect of refined search query 219 yielding refined search results 270. At step 1466, search engine 140 sends to browser 200 the refined search results 270 and instructions for displaying the refined search results 270. In some implementations, the instructions include instructions for displaying a visual representation of a refinement relationship between first search query 212 and refined search query 219. In some implementations, the instructions include instructions for displaying a visual indication that refinement button 221 was selected before refinement button 225 was selected.

At step 1468, browser 200 receives from search engine 140 the refined search results 270 and instructions for displaying the refined search results 270. At step 1470, browser 200 displays a clicked representation of button 225 and, in search bar 210, the refined search query 219 corresponding to button 225. This serves as a visual representation of a refinement relationship between first search query 212 and refined search query 219. In some implementations, browser 200 also displays a visual indication that refinement button 221 was previously selected. At step 1472, browser 200 displays at least one of the refined search results 270.

It should be noted that the particular set of steps depicted in FIG. 14 is meant to describe a potential interaction of a user with one implementation of the present technology. In other implementations and other interactions, some steps may be omitted and others may be added. In particular, in some implementations of the present technology, steps 1424, 1440, and 1460 are not performed by the client application, and steps 1426, 1442, and 1462 are not performed by the search engine. Instead, in such an alternative implementation, an additional step may be introduced, possibly after step 1410, wherein search engine 140 effects a plurality of refined searches in respect of each of the refined search queries formed by application of the first suggested search query refinements to the first search, each refined search yielding refined search results which are sent by search engine 140 to the client application without the client application having sent a request for those refined search results, contrary to the implementation described in FIG. 14. Likewise, search engine 140 may effect further-refined searches in respect of each of the further SSQRs in respect of each of the refined search queries, each further-refined search query yielding further-refined search results, and send those further-refined search results to the client application without the client application having sent a request for those further-refined search results.

Suggested search query refinements are generated by the search engine based on various types of information. In some instances SSQRs may be static categories of search results determined based on properties of the search results contained in the search component 142's search index. For example, the SSQRs may refer to different types of media. However, in other instances, the search engine may determine the SSQRs dynamically on the basis of information about the search query. An example of the determination of suggested search query refinements follows in respect of the search query "hobbit".

Client application 200 sends the search query 212 ("hobbit") to search component 142 of search engine 140.

Search component 142 performs a lexical and semantic analysis of search query 212. For example, key search terms of the search query are identified, particularly those carrying quantifiably measurable semantic meaning, as well as "marker terms" which carry an inherent indication of a cluster of search results of a particular type (e.g. "book", "film", "movie", "game", "store", etc.). If the first search query contains such marker terms, there is no need to generate suggested search query refinements: the marker terms already identify the cluster of search results of interest.

However, if insufficient marker terms are present, suggested search query refinements need to be determined. Search component 142 asks search quality component 146 for search queries related to the search query 212 (e.g. "hobbit"). Search quality component 146 responds with the following types of related queries:

Search queries containing the same search terms as search query 212 ("hobbit"), for example "hobbit the book", "watch online movies about hobbits", "what does hobbit mean", etc.

Search queries which have been submitted to the search engine shortly after previous search queries equal to or related to search query 212. With regard to our example, these would be search queries that users submitted after searching for "hobbit" or searches related to "hobbit". For example, if either user 100 or another user previously searched for "hobbit" and thereafter entered another search query such as "lord of the rings", the query "lord of the rings" would therefore be considered a related search query with respect to the query "hobbit".

Along with the related search queries, search quality component 146 also provides search result statistics for each of the related search queries to search component 142.

Next search component 142 determines groups of search queries related to the search query "hobbit". The groups are determined by search component 142 based on a statistical estimate of the user's likely interests in the following manner.

First, search component 142 filters the related search queries to only "meaningful" search queries, being those identified as having provided the user with the information he or she sought, based on an analysis of the user's clicking behavior while browsing the SERP. This analysis may entail a detailed probability analysis based on a variety of factors including the number of links the user clicked on the SERP, the amount of time the user spent reading each link, the number of subsequent search queries, the number of related search queries, and other factors. This analysis may also apply known techniques in the realm of search result ranking.

Second, search component 142 groups the meaningful queries based on past user behaviors. In particular, if users having submitted different meaningful search queries later visited one or more links in common, these meaningful search queries are considered to be related to each other based on user behavior. For example, imagine that search component 142 has determined that the following search queries related to search query 212 ("hobbit") are meaningful search queries:

"lord of the rings movie"
"popular books today"
"best costumes for Halloween"
"hobbit the movie"
"download torrent hobbit"
"buy hobbit stuff"

Search component 142 analyzes the statistical data provided by search quality component 146 and observes that users who submitted these search queries subsequently clicked on the following links:

| | |
|---|---|
| "lord of the rings movie" | links 1, 2, 3 |
| "popular books today" | links 7, 8, 9 |
| "costumes for Halloween" | links 10, 11, 12 |
| "hobbit the movie" | links 1, 2, 5, 6 |
| "download torrent hobbit" | links 3, 6 |
| "buy hobbit stuff" | links 10, 11 |

Given the above results, search component 142 groups the search queries as follows:

| | |
|---|---|
| Group 1: | |
| "lord of the rings movie" | links 1, 2, 3 |
| "hobbit the movie" | links 1, 2, 5, 6 |
| "download torrent hobbit" | links 3, 6 |
| Group 2: | |
| "costumes for Halloween" | links 10, 11, 12 |
| "buy hobbit stuff" | links 10, 11 |
| Group 3: | |
| "popular books today" | links 7, 8, 9 |

Third, search component 142 determines the popularity of each group based on the cumulative popularity of the meaningful queries within each group. In other words, search component 142 calculates the total number of times users have submitted search queries belonging to each group, and the group with the most submitted search queries is deemed to be the most popular. Search component 142 then selects the most popular groups.

Fourth, within each group, search component 142 ranks the search queries by popularity. Let's imagine that in Group 1, the most popular queries are (1) "hobbit the movie", (2) "download torrent hobbit", and (3) "lord of the rings movie"

Finally, search component 142 determines the suggested search query refinement for each group by cropping the search terms of the initial search query 212 (i.e. "hobbit") from the most popular search query in the group, as well as any other irrelevant search terms (e.g. "the", "a", etc.). Thus, for group 1, "hobbit the movie" is cropped to "movie" and becomes the suggested search query refinement in respect of Group 1, causing the search term "movie" to be appended to search query 212 "hobbit" if selected (i.e. composing the refined search query "hobbit movie"). In some cases, cropping the most popular query in a group may result in a cropped search query consisting of more than one search term. In such cases, search component 142 may, in some implementations, perform an additional step, analyzing the remaining uncropped search query terms and determining which is most unique as compared with the other suggested search query refinements already identified. In other implementations, suggested search query refinements may include more than one search term.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A method of displaying by a client application running on at least one digital electronic device in communication with a search engine a plurality of user-selectable refinements to a first search query including at least one first search term, the method comprising:
    (a) sending by the client application to the search engine the first search query;
    (b) receiving by the client application from the search engine first search results in respect of the first search query and first suggested search query refinements having been dynamically determined by the search engine based at least in part on an analysis of groups of related search queries being related to the first search query, the analysis of groups including:
    determining the related search queries as being meaningful based on past user behaviours by filtering the related search queries to only those identified as having provided search results which provided a user with information sought by the user;
    grouping the meaningful related search queries into the groups based on past behaviors of users with search results that are provided in response to the meaningful related search queries, wherein the past behaviors of users include common Internet resources having been visited by the users after they were provided with the search results in response to the meaningful related search queries; and
    determining a first suggested search query refinement for each group based on a comparison of the first search query and the meaningful related search queries of a respective group, each of the first suggested search query refinements corresponding to a refined search query including the at least one first search term and at least one additional search term derived from one of the meaningful related search queries, the one of the meaningful related search queries having been determined as being the most popular in its respective group, the at least one additional search term having being determined as being the most unique as compared with previously identified suggested search query refinements;
    (c) displaying by the client application at least one first search result and, apart from a search bar, the first suggested search query refinements, the first suggested search query refinements being selectable by a user via at least one first graphical object;
    (d) receiving by the client application from a user via the at least one first graphical object a first selection of one of the first suggested search query refinements, the first selection corresponding to a first refined search query including the at least one first search term and at least one first additional search term;
    (e) receiving by the client application from the search engine first refined search results in respect of the first refined search query; and
    (f) displaying by the client application at least one first refined search result and a visual representation of a refinement relationship between the first search query and the first refined search query.

2. The method of claim 1, wherein:
    (c) includes displaying by the client application a first plurality of buttons selectable by a user, each button in the first plurality of buttons corresponding to one of the first suggested search query refinements and including text representative of that suggested search query refinement; and
    (d) is receiving by the client application from a user a selection of a button from the first plurality of buttons.

3. The method of claim 2, wherein (f) includes displaying by the client application a visual indication that the button has been selected.

4. The method of claim 3, further comprising:
    (g) receiving by the client application from a user via the at least one first graphical object a second selection of one of the first suggested search query refinements, the second selection corresponding to a second refined search query including the at least one first search term and at least one second additional search term;
    (h) receiving by the client application from the search engine second refined search results in respect of the second refined search query; and
    (i) displaying by the client application at least one second refined search result and a visual representation of a refinement relationship between the first search query and the second refined search query.

5. The method of claim 4, further comprising:
    (j) displaying by the client application, concurrently with the visual representation of a refinement relationship between the first search query and the second refined search query, a visual indication that the at least one first refined search result was displayed before the at least one second refined search result was displayed.

6. The method of claim 4, wherein:
    (c) includes displaying by the client application a first plurality of buttons selectable by a user, each button in the first plurality of buttons corresponding to one of the first suggested search query refinements and including text representative of that suggested search query refinement;
    (d) is receiving by the client application from a user a selection of a first button from the first plurality of buttons; and (g) is receiving by the client application from a user a selection of a second button from the first plurality of buttons.

7. The method of claim 6, wherein:
(f) includes displaying by the client application a visual indication that the first button has been selected; and
(i) includes displaying by the client application a visual indication that the second button has been selected.

8. The method of claim 7, further comprising:
(j) displaying by the client application, concurrently with the visual indication that the second button has been selected, a visual indication that the first button was selected before the second button was selected.

9. The method of claim 1, further comprising:
(g) receiving by the client application from the search engine second suggested search query refinements, each of the second suggested search query refinements corresponding to a further-refined search query including the at least one first search term, the at least one first additional search term, and at least one further additional search term;
(h) displaying by the client application, apart from the search bar and apart from the first suggested search query refinements, the second suggested search query refinements, the second suggested search query refinements being selectable by a user via at least one second graphical object;
(i) receiving by the client application from a user via the at least one second graphical object a second selection of one of the second suggested search query refinements, the second selection corresponding to a further-refined search query including the at least one first search term, the at least one first additional search term, and at least one further additional search term;
(j) receiving by the client application from the search engine further-refined search results in respect of the further-refined search query; and
(k) displaying by the client application at least one further-refined search result and a visual representation of a refinement relationship between the first search query, the first refined search query, and the further-refined search query.

10. The method of claim 9, wherein:
(c) includes displaying by the client application a first plurality of buttons selectable by a user, each button in the first plurality of buttons corresponding to one of the first suggested search query refinements and including text representative of that suggested search query refinement;
(d) is receiving by the client application from a user a selection of a first button from the first plurality of buttons;
(h) includes displaying by the client application, apart from the first plurality of buttons, a second plurality of buttons selectable by a user, each button in the second plurality of buttons corresponding to one of the second suggested search query refinements and including text representative of that suggested search query refinement; and
(i) is receiving by the client application from a user a selection of a second button from the second plurality of buttons.

11. The method of claim 1, further comprising:
(g) receiving by the client application from a user via the at least one first graphical object a tentative selection of one of the first suggested search query refinements, the tentative selection corresponding to a tentative refined search query, the tentative refined search query including the at least one first search term and at least one tentative additional search term; and
(h) displaying by the client application in the search bar the tentative refined search query.

12. The method of claim 11, wherein:
(c) includes displaying by the client application a first plurality of buttons selectable by a user, each button in the first plurality of buttons corresponding to one of the first suggested search query refinements and including text representative of that suggested search query refinement; and
(g) is receiving by the client application an indication that a pointer controlled by a user is located over a button from the first plurality of buttons.

13. The method of claim 1, wherein the analysis of groups of related search queries includes an analysis of past user behaviors of users having submitted the related search queries.

14. A method of providing to a client application running on at least one digital electronic device in communication with a search engine a plurality of user-selectable refinements to a first search query including at least one first search term, the method comprising:
(a) receiving by the search engine from the client application the first search query;
(b) effecting by the search engine a first search in respect of the first search query yielding first search results;
(c) determining dynamically first suggested search query refinements based at least in part on an analysis of groups of related search queries being related to the first search query, the analysis of groups including:
determining the related search queries as being meaningful based on past user behaviours by filtering the related search queries to only those identified as having provided search results which provided a user with information sought by the user;
grouping the meaningful related search queries into the groups based on past behaviors of users with search results that are provided in response to the meaningful related search queries, wherein the past behaviors of users include common Internet resources having been visited by the users after they were provided with the search results in response to the meaningful related search queries; and determining a first suggested search query refinement for each group based on a comparison of the first search query and the meaningful related search queries of a respective group, each of the first suggested search query refinements corresponding to a refined search query including the at least one first search term and at least one additional search term derived from one of the meaningful related search queries, the one of the meaningful related search queries having been determined as being the most popular in its respective group, the at least one additional search term having being determined as being the most unique as compared with previously identified suggested search query refinements;
(d) sending by the search engine to the client application the first search results, the first suggested search query refinements, and instructions for displaying (1) at least one first search result and (2) apart from a search bar, the first suggested search query refinements, the first suggested search query refinements being selectable by a user via at least one first graphical object;
(e) effecting by the search engine a first refined search in respect of a first refined search query including the at least one first search term and at least one first additional search term, the first refined search yielding first refined search results;

And (f) sending by the search engine to the client application the first refined search results and instructions for displaying at least one first refined search result and a visual representation of a refinement relationship between the first search query and the first refined search query.

15. The method of claim 14, wherein (d) includes sending by the search engine to the client application instructions for displaying a first plurality of buttons selectable by a user, each button in the first plurality of buttons corresponding to one of the first suggested search query refinements and including text representative of that suggested search query refinement.

16. The method of claim 15, wherein (f) includes sending by the search engine to the client application instructions for displaying a visual indication that a button from the first plurality of buttons has been selected.

17. The method of claim 14, further comprising:
(g) effecting by the search engine a second refined search in respect of a second refined search query including the at least one first search term and at least one second additional search term, the second refined search query yielding second refined search results; and
(h) sending by the search engine to the client application the second refined search results and instructions for displaying at least one second refined search result and a visual representation of a refinement relationship between the first search query and the second refined search query.

18. The method of claim 17, further comprising:
(k) sending by the search engine to the client application instructions for displaying, concurrently with the visual representation of a refinement relationship between the first search query and the second refined search query, a visual indication that the at least one first refined search result was displayed before the at least one second refined search result was displayed.

19. The method of claim 17, wherein (d) includes sending by the search engine to the client application instructions for displaying a first plurality of buttons selectable by a user, each button in the first plurality of buttons corresponding to one of the first suggested search query refinements and including text representative of that suggested search query refinement.

20. The method of claim 19, wherein:
(f) includes sending by the search engine to the client application instructions for displaying a visual indication that a first button from the first plurality of buttons has been selected; and
(h) includes sending by the search engine to the client application instructions for displaying a visual indication that a second button from the first plurality of buttons has been selected.

21. The method of claim 20, further comprising:
(k) sending by the search engine to the client application instructions for displaying, concurrently with the visual indication that the second button has been selected, a visual indication that the first button was selected before the second button was selected.

22. The method of claim 14, further comprising:
(g) sending by the search engine to the client application second suggested search query refinements, each of the second suggested search query refinements corresponding to a further-refined search query including the at least one first search term, the at least one first additional search term, and at least one further additional search term, and instructions for displaying, apart from the search bar and apart from the first suggested search query refinements, the second suggested search query refinements, the second suggested search query refinements being selectable by a user via at least one second graphical object;
(h) effecting by the search engine a further-refined search in respect of a further-refined search query including the at least one first search term, the at least one first additional search term, and at least one further additional search term, the further-refined search yielding further-refined search results; and
(i) sending by the search engine to the client application the further-refined search results and instructions for displaying at least one further-refined search result and a visual representation of a refinement relationship between the first search query, the first refined search query, and the further-refined search query.

23. The method of claim 22, wherein:
(d) includes sending by the search engine to the client application instructions for displaying a first plurality of buttons selectable by a user, each button in the first plurality of buttons corresponding to one of the first suggested search query refinements and including text representative of that suggested search query refinement; and
(g) includes sending by the search engine to the client application instructions for displaying, apart from the first plurality of buttons, a second plurality of buttons selectable by a user, each button in the second plurality of buttons corresponding to one of the second suggested search query refinements and including text representative of that suggested search query refinement.

24. The method of claim 14, wherein (d) includes sending by the search engine to the client application instructions for displaying in the search bar, upon receiving from a user via the at least one first graphical object a tentative selection of one of the first suggested search query refinements, a tentative refined search query corresponding to the tentative selection, the tentative refined search query including the at least one first search term and at least one tentative additional search term.

25. The method of claim 14, wherein (d) includes:
sending by the search engine to the client application instructions for displaying a first plurality of buttons selectable by a user, each button in the first plurality of buttons corresponding to one of the first suggested search query refinements and including text representative of that suggested search query refinement; and
sending by the search engine to the client application instructions for displaying in the search bar, upon receiving an indication that a pointer controlled by a user is located over a button from the first plurality of buttons, a tentative refined search query corresponding to the tentative selection, the tentative refined search query including the at least one first search term and at least one tentative additional search term.

26. The method of claim 14, wherein (c) includes analyzing past user behaviors of users having submitted the related search queries.

* * * * *